United States Patent
Trivelpiece et al.

(10) Patent No.: US 11,229,812 B2
(45) Date of Patent: Jan. 25, 2022

(54) MICROWAVE FIRE PROTECTION DEVICES

(71) Applicant: Tyco Fire Products LP, Lansdale, PA (US)

(72) Inventors: Steve Edward Trivelpiece, Rancho Santa Margarita, CA (US); Craig Evan Trivelpiece, Mission Viejo, CA (US)

(73) Assignee: Tyco Fire Products LP, Lansdale, PA (US)

( * ) Notice: Subject to any disclaimer, the term of this patent is extended or adjusted under 35 U.S.C. 154(b) by 85 days.

(21) Appl. No.: 16/272,697

(22) Filed: Feb. 11, 2019

(65) Prior Publication Data

US 2019/0247689 A1   Aug. 15, 2019

Related U.S. Application Data

(60) Provisional application No. 62/629,290, filed on Feb. 12, 2018.

(51) Int. Cl.
| | |
|---|---|
| *A62C 35/68* | (2006.01) |
| *A62C 37/10* | (2006.01) |
| *F16K 37/00* | (2006.01) |
| *A62C 37/50* | (2006.01) |
| *F16K 31/06* | (2006.01) |
| *A62C 37/46* | (2006.01) |

(52) U.S. Cl.
CPC .............. *A62C 35/68* (2013.01); *A62C 37/10* (2013.01); *A62C 37/46* (2013.01); *A62C 37/50* (2013.01); *F16K 31/0675* (2013.01); *F16K 37/005* (2013.01)

(58) Field of Classification Search
CPC ......... A62C 35/68; A62C 37/10; A62C 37/46; A62C 37/50
USPC ........ 340/539.22, 572.1, 686.1, 963; 169/16, 169/37, 60, 61
See application file for complete search history.

(56) References Cited

U.S. PATENT DOCUMENTS

| | | | | |
|---|---|---|---|---|
| 3,713,148 A | * | 1/1973 | Cardullo .............. | G07B 15/063 342/42 |
| 4,357,602 A | * | 11/1982 | Lemelson .............. | G08B 25/10 340/524 |
| 4,596,289 A | * | 6/1986 | Johnson ................. | A62C 37/09 169/37 |
| 4,660,648 A | * | 4/1987 | Zen ........................ | A62C 37/09 169/38 |
| 4,814,766 A | * | 3/1989 | Domingue ............. | G08B 17/02 169/61 |
| 5,669,449 A | * | 9/1997 | Polan ..................... | A62C 37/08 169/16 |

(Continued)

*Primary Examiner* — Steven J Ganey
(74) *Attorney, Agent, or Firm* — Foley & Lardner LLP

(57) ABSTRACT

A fire protection system includes a pipe system in fluid communication with a water source. A local processing unit is operatively coupled to a radio frequency identification (RFID) tag reader antenna. Sensors monitoring a sensor area for the presence of a fire are in electrical communication with the local processing unit. Fluid distribution devices in fluid communication with the pipe system are configured to deliver water from the water source to the sensor area. An RFID tag apparatus is coupled to one of the fluid distribution devices and includes an RFID tag antenna positioned within the pipe system and is configured to transmit and receive radio frequency (RF) signals to and from the RFID reader antenna and local processing unit, through the pipe system.

20 Claims, 19 Drawing Sheets

(56) References Cited

U.S. PATENT DOCUMENTS

| | | | | |
|---|---|---|---|---|
| 5,971,080 A * | 10/1999 | Loh | | A62C 35/66 169/17 |
| 6,357,531 B1 * | 3/2002 | Asselin | | A62C 35/66 169/17 |
| 6,446,732 B1 * | 9/2002 | Polan | | A62C 31/02 169/37 |
| 7,081,815 B2 * | 7/2006 | Runyon | | E05G 1/10 169/51 |
| 7,456,750 B2 * | 11/2008 | Popp | | A62C 3/002 269/61 |
| 7,623,033 B2 * | 11/2009 | Ainsworth | | G06Q 10/08 340/539.13 |
| 7,633,393 B2 * | 12/2009 | Bonne | | G08B 5/36 340/572.1 |
| 7,810,577 B2 * | 10/2010 | Popp | | A62C 3/08 169/70 |
| 8,122,968 B2 * | 2/2012 | Johnson | | A62C 37/44 169/16 |
| 8,421,629 B2 * | 4/2013 | Carr | | G06K 19/0723 340/572.1 |
| 8,489,015 B2 * | 7/2013 | Becker | | H01Q 21/0043 455/3.01 |
| 8,588,983 B2 * | 11/2013 | Grabinger | | F24F 11/00 700/276 |
| 8,659,420 B2 * | 2/2014 | Salvat, Jr. | | G06Q 10/08 340/539.13 |
| 8,749,182 B2 * | 6/2014 | Grabinger | | H02P 5/74 318/400.26 |
| 8,760,103 B2 * | 6/2014 | Bokusky | | G05B 9/02 318/563 |
| 8,887,819 B2 * | 11/2014 | Lee | | A62C 37/36 169/7 |
| 8,922,140 B2 * | 12/2014 | McNallan | | G05B 19/0423 318/3 |
| 9,041,319 B2 * | 5/2015 | Grabinger | | G05B 19/0423 318/3 |
| 9,095,736 B2 * | 8/2015 | Kochelek | | F16L 55/1683 |
| 9,106,171 B2 * | 8/2015 | Bartholomew | | H02P 29/68 |
| 9,248,917 B2 * | 2/2016 | Gastonides | | G08B 29/188 |
| 9,805,588 B2 * | 10/2017 | Gritzo | | H04Q 9/00 |
| 9,981,529 B2 * | 5/2018 | Waseen | | B60H 1/00964 |
| 10,113,762 B2 * | 10/2018 | Grabinger | | F24F 11/70 |
| 10,441,833 B2 * | 10/2019 | Pohl | | F16K 15/033 |
| 2005/0073406 A1 * | 4/2005 | Easley | | G08B 25/10 340/539.1 |
| 2005/0087235 A1 * | 4/2005 | Skorpik | | F16K 37/00 137/554 |
| 2006/0226970 A1 * | 10/2006 | Saga | | G08B 27/001 340/506 |
| 2007/0241866 A1 * | 10/2007 | Cool | | G08B 29/145 340/10.41 |
| 2007/0241891 A1 * | 10/2007 | Bonne | | G08B 5/36 340/539.22 |
| 2008/0048031 A1 * | 2/2008 | Milliner | | G06Q 40/08 235/385 |
| 2008/0090519 A1 * | 4/2008 | Rofougaran | | H04B 5/0075 455/41.1 |
| 2008/0277125 A1 * | 11/2008 | Wilkins | | A62C 35/68 169/46 |
| 2010/0004803 A1 * | 1/2010 | Manfredi | | B64D 25/00 701/14 |
| 2010/0070097 A1 * | 3/2010 | Morgenstern | | A62C 37/40 700/284 |
| 2011/0298558 A1 * | 12/2011 | Becker | | H01P 5/103 333/27 |
| 2012/0126700 A1 * | 5/2012 | Mayfield | | H05B 47/19 315/86 |
| 2013/0186999 A1 * | 7/2013 | Huber | | B64D 9/00 244/118.1 |
| 2014/0305524 A1 * | 10/2014 | Heizer | | F17D 5/00 137/551 |
| 2016/0303412 A1 * | 10/2016 | Schmitt | | A62C 35/68 |

* cited by examiner

MICROWAVE FIRE PROTECTION DEVICES

CROSS-REFERENCE TO RELATED APPLICATION

This application claims the benefit of and priority to U.S. Provisional Application No. 62/629,290, filed Feb. 12, 2018, the content of which is hereby incorporated by reference in its entirety.

BACKGROUND

Water sprinklers can be used in wet pipe fire protection systems and dry pipe fire protection systems. Wet pipe sprinkler systems can be filled with water under pressure at most times. When the temperature at a sprinkler exceeds a trigger point, the sprinkler opens and the water flows through the pipes and out the sprinklers coupled to the pipes. Dry pipe systems can be filled with air or a gas (e.g., nitrogen) under pressure, so that when a sprinkler opens a drop in gas pressure is detected and water is forced into the sprinkler system.

SUMMARY

Various embodiments of the present technology relate to using microwave or other radio frequency (RF) signals for communication in fire protection systems, such as a dry pipe sprinkler system. The pipes of the fire protection system can act as a waveguide through which electronic components of the sprinkler system can communicate. For example, a local processing unit (LPU) can transmit and receive microwaves through a pipe system to sensors (or detectors), sprinklers (or more generally distribution devices), and other LPUs. Similarly, sprinklers (also referred to herein as distribution devices) and sensors (also referred to herein as detectors) may also transmit and receive microwaves to one another, using the pipes of a fire protection system as a waveguide for the microwave signals. Because a waveguide helps a signal maintain its signal strength, the embodiments disclosed herein can provide for a communications network that can utilize low power devices, such as radio frequency identification (RFID) devices. In some embodiments, sensors and other devices can utilize the microwave signals passing through the pipes to power the sensors or devices. Furthermore, the waves passing through the pipes can be processed to determine whether corrosion has occurred in the pipes.

At least one aspect relates to a fire protection system. The fire protection system includes a pipe system, a local processing unit, a plurality of sensors, and a plurality of fluid distribution devices. The pipe system is in fluid communication with a water source. The local processing unit is operatively coupled to an RFID reader antenna. The plurality of sensors each monitor a sensor area for the presence of a fire, and are each in electrical communication with the local processing unit. The plurality of fluid distribution devices are in fluid communication with the pipe system and are configured to deliver water from the water source to the sensor area. Each of the plurality of fluid distribution devices include a frame body and an RFID tag apparatus. The frame body has an inlet, an outlet in fluid communication with the inlet, and an actuator movable between a first position restricting fluid flow from the inlet through the outlet and a second position allowing fluid flow from the inlet through the outlet. The RFID tag apparatus is coupled to the frame body and is configured to controllably move the actuator between the first position and the second position. The RFID tag apparatus includes an RFID tag antenna, a processing circuit, and a power circuit. The RFID tag antenna is positioned within the pipe system and is configured to transmit and receive RF signals to and from the RFID reader antenna and local processing unit. The processing circuit is operatively coupled to the RFID tag antenna and is configured to modulate and transmit RF signals through the RFID tag, and further configured to receive and demodulate RF signals received by the RFID tag antenna. The processing circuit is in electrical communication with the actuator and is configured to move the actuator between the first position and the second position in response to an RF signal received by the RFID tag antenna. The power circuit is operatively coupled to the processing circuit and the RFID tag antenna and supplies power to the processing circuit and the RFID tag antenna.

At least one aspect relates to a fluid distribution device. The fluid distribution device includes a frame body and an RFID tag apparatus coupled to the frame body. The frame body has an inlet, an outlet in fluid communication with the inlet, and an actuator movable between a first position restricting fluid flow from the inlet through the outlet and a second position allowing fluid flow from the inlet through the outlet and a second position allowing fluid flow from the inlet through the outlet. The RFID tag apparatus is configured to controllably move the actuator between the first position and the second position. The RFID tag apparatus includes an antenna configured to transmit and receive RF signals, a processing circuit, and a power circuit. The processing circuit is operatively coupled to the antenna and is configured to modulate and transmit RF signals through the antenna. The processing circuit is further configured to receive and demodulate RF signals received by the antenna. The processing circuit is in electrical communication with the actuator and is configured to move the actuator between the first position and the second position in response to an RF signal received by the antenna. The power circuit is operatively coupled to the processing circuit and the antenna, and supplies power to the processing circuit and the antenna.

At least one aspect relates to a detector device. The detector device includes a sensor and an RFID tag apparatus coupled to the sensor. The sensor monitors a sensor area for the presence of a fire. The RFID tag apparatus is coupled to the sensor and is configured to transmit information received from the sensor. The RFID tag apparatus includes an antenna, a processing circuit, and a power circuit. The antenna is configured to transmit and receive RF signals. The processing circuit is operatively coupled to the antenna and is configured to modulate and transmit RF signals through the antenna. The processing circuit is further configured to receive and demodulate signals received by the antenna. The processing circuit is in electrical communication with the sensor and is configured to prompt the sensor for a measurement in response to an RF signal received by the antenna. The power circuit is operatively coupled to and supplies power to the processing circuit and the antenna.

BRIEF DESCRIPTION OF THE DRAWINGS

The disclosure will become more fully understood from the following detailed description, taken in conjunction with the accompanying figures, in which.

DETAILED DESCRIPTION

Figure 1A:
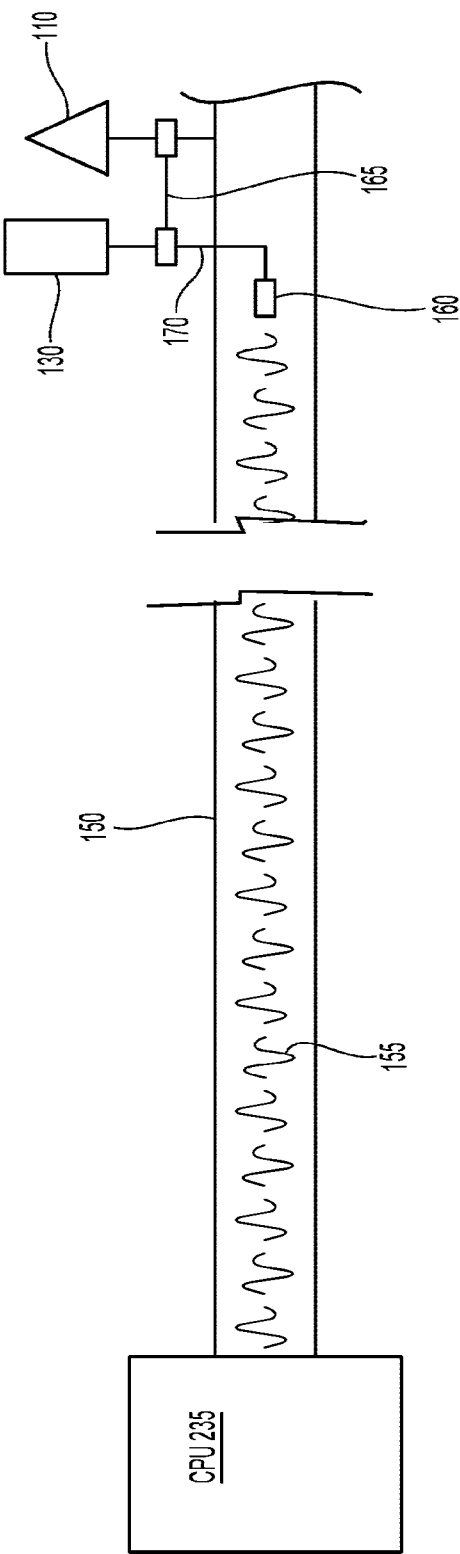
FIG. 1A is a schematic view of a pipe of a fire protection system acting as a waveguide.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to fire protection systems. More specifically, the present disclosure relates to apparatuses, systems, methods, and computer readable media for communications between components of fire protection systems, including wet pipe and dry pipe systems, as well as remote monitoring of corrosion of equipment such as, e.g., pipes. Dry pipe systems may be maintained in a vacuum or near vacuum state. Dry pipe systems can be used, for example, in areas where the temperature drops below 40 degrees Fahrenheit and water might freeze or damage the pipes. Dry pipe sprinklers may be used in locations where high value items are stored, where water damage and accidental triggering can cause huge losses or damage, or in other scenarios.

Sprinklers in these fire protection systems include mechanical devices that trigger based upon, for example, the effect of temperature on their trigger mechanism. The sprinklers can operate automatically when their heat-activated element is heated to its thermal rating or above, allowing water to discharge over a specified area upon delivery of the firefighting fluid. The trigger temperature of these devices can be high enough that significant fires have already started.

Sprinkler or fire protection systems may be inspected annually. For dry pipe systems, water is triggered into the pipes and the time it takes to reach the farthest or most hydraulically demanding sprinkler head (with a release valve) from the water source is measured to ensure that the time is within applicable regulations. Although sprinkler systems are supposed to have a slope to allow water from these tests to drain, there can be enough water that lingers in a pipe to cause some level of corrosion over time in the pipes.

It may not be possible to completely eliminate the corrosion process, and in time, the corrosion of the components in a system can lead to damage and/or performance issues. For example, corrosion of pipes in a fire sprinkler system can result in partial blockage of pipes and/or leaks. Corrosion can flourish even in dry pipes such as in dry-type fire sprinkler systems because these pipes are never 100% dry. Trapped water and/or humid air from air compressors can create the perfect conditions for corrosion to occur. Because corrosion in the fire sprinkler system can affect overall system performance, systems and methods of the present solution can monitor corrosion.

Referring generally to the figures, systems and methods of the present solution can use microwave or other RF signals for communication in fire protection systems, such as a dry pipe sprinkler system. The pipes of the fire protection system can act as a waveguide through which electronic components of the sprinkler system can communicate. For example, an LPU can transmit and receive microwaves through a pipe system to sensors (e.g., detectors), sprinklers (e.g., distribution devices), and other LPUs. Sprinklers and sensors may transmit and receive microwaves to one another, using the pipes of a fire protection system as a waveguide for the microwave signals. Because a waveguide helps a signal maintain its signal strength, the present solution can enable a communications network that can utilize low power devices, such as RFID devices. Sensors and other devices can utilize the microwave signals passing through the pipes to power the sensors or devices.

As more smart devices are proliferated (e.g., a sprinkler with additional sensors to ensure that a fire is occurring or determine a fire is occurring sooner and an ability to communicate with a base station or other sprinklers/sensors), issues arise regarding those devices need for power, the ability to communicate information back to a control system, and to be commanded by a control system. In some systems, standard wiring to each sprinkler could be used to create a smart sprinkler system but this may require installation of extensive wiring during installation or retrofitting. Various wireless communications systems could be used but power or a battery would need to be wired to each sprinkler and sufficient wireless coverage would have to be installed. The present solution can remove or reduce the need to supply external power to electronic sensors, actuators, transmitters, and other devices. The present solution can provide for a communications system that can be advantageously utilized without having to use other external communication networks, such as Wi-Fi networks. This can be beneficial because RFID devices and/or sensors may not need as much power to transmit and receive signals as compared to devices/sensors that utilize other communication protocols like Wi-Fi. Some devices/sensors as disclosed herein may not use any external power, and may be instead powered by the RF signals sent within the pipes of the sprinkler system. In addition, if any services like Wi-Fi are interrupted (e.g., due to the presence of a fire), the RF or microwave communication system using the sprinkler pipes as waveguides may still be operational. The present solution can utilize existing infrastructure to provide power and two way communications to smart sprinklers, detectors, and other devices without having to run wires to each device, provide sufficient wireless coverage, or provide battery maintenance to each device.

These waves, signals, and/or communications that travel through the pipes serving as a waveguide can be processed to determine if corrosion has occurred in the pipes. It can be difficult to know about or measure the corrosion. The present solution can execute signal processing that can occur without having to test individual sections of pipe or removing a test coupon. This monitoring can happen continuously and/or periodically, such that a rate of corrosion can be monitored to predict when pipes will need to be replaced to avoid a failure. The signal processing can identify an approximate location of the corrosion in a sprinkler pipe system. The signatures of microwave signals are sensitive to surface changes of a waveguide, so corrosion in a pipe serving as a waveguide will change the signature of a signal passing through the waveguide (as opposed to a wave passing through the same pipe before it was corroding). Through signal processing, the system may determine the position of corrosion to within one foot based on the signal signatures. The signal processing can also indicate an extent of the corrosion in a pipe or pipes.

Systems and methods as described herein can enable a fully contained communications system within the pipes and components of a fire protection system, since RF signals will generally stay inside the pipes. This can give advantages for security and reliability of the system, making it more resistant to interference, intentional jamming, snooping, and/or issues caused by environmental changes that could affect wireless systems. The present solution can be retrofit to existing pipe architectures. Sprinklers, detectors, and local processing units may be replaced or updated, but an overall piping system would not have to be replaced. For example, new sprinkler heads can be installed that communicate through the existing pipes without having to make significant modifications to existing pipe architecture. Additionally, ongoing maintenance may be reduced as use of batteries may be reduced or eliminated compared to other systems capable of wireless communication. For example, batteries would not need to be inspected or changed (because batteries can be eliminated from a system or charged using signals of the system) and there would be no wireless hotspots a user has to worry about maintaining. Batteries may be charged using wireless charging techniques that use the power from noise signals captured with an antenna to charge a capacitor or battery.

The present solution can give users/systems the option to command triggering or enable local triggering of sprinkler heads. The systems may power, control, and/or communicate with other sensors or devices adjacent to the sprinklers and/or provide power to any attached devices regardless of whether those devices communicate with a local processing unit or other device(s).

Pipes can be used as waveguides that can guide waves, such as RF signals, sound, microwaves, and other electromagnetic waves. A wave traveling within a waveguide will lose less energy than a wave that is not traveling within a waveguide, because the waveguide itself restricts at least one dimension (but often two dimensions) in which the wave can expand. Accordingly, the signal strength at receivers or antennas in the system (such as at sprinkler heads) can be stronger than signals of a system that use RF signals without waveguides.

Microwave signals can include RF signals that are in the range of 1 to 100 GHz and can be routed and contained in waveguides. At these frequencies, cables may greatly attenuate microwave signals so that cables may only be used efficiently over short distances. The present solution can use a waveguide that may be, for example, a rectangular metal tube (e.g., pipe). The microwave can travel down the tube with very low attenuation when compared with cables. For example, PVC pipes may be used if the inside or outside is coated with a thin layer of metal such as copper. Although dry pipe sprinklers are discussed here, other metallically-coated pipe that is filled with a gas or vacuum and used for power or charging circuits and for one or bi-directional communications can be used as well. Other shapes of waveguide are also contemplated herein, including waveguides with circular, square, elliptical, and other cross-sectional shapes.

The frequency used to communicate within the waveguide can be chosen based upon the size and shape of the pipes within the system. The dimensions of the pipes within the system can affect the efficiency of signal transmission through the system (e.g., the amount or rate of power loss/dissipation as a wave passes through the system), so the frequency of the microwave can be chosen within a certain range based upon the size and/or shape of the waveguide tube. A circular pipe like that used in dry pipe systems with, for example, diameters of 2 inches to 6 inches, can efficiently transmit microwave frequencies in the 1 to 3.5 GHz range. Accordingly, in various embodiments, pipes of 2 to 6 inches and waves of 1 to 3.5 GHz may be used.

RFID can enable two-way communications, measurements, and other actions, while being passive. The RFID chip/tag can power itself from a received RF signal so no battery is necessary. The RFID chips/tags can be very sensitive and capable of operating using small amounts of energy in high noise environments. The noise may be generated, at least partially, from the waves propagating within the pipe sprinkler system. RFID chips/tags can, for example, read a temperature from a sensor and control an input/output (I/O) pin that could activate a sprinkler, all based on an RF signal received by the RFID chip/tag and without additional power being supplied. The noise can also be captured by an RFID chip to power a capacitor or battery used to power sensors, communication devices, and/or sprinkler actuators. In various embodiments, passive RFID may be used in combination with active RFID or hybrid RFID systems as disclosed herein. Active and/or hybrid RFID systems as well as other types of wireless communications systems may be used in lieu of passive RFID systems as well.

The attenuation of the dry pipe system to microwaves in frequencies such as 1 to 3.5 GHz may be low enough to support, for example, over 1,000 feet of pipe between an RF signal transmitter and an RFID chip/tag. In other words, in a sprinkler pipe system, microwave RF signals supply enough energy to power RFID chips/tags in a sprinkler and support two-way communications with those RFID chips/tags, even if pipe length on the order of 1,000 feet exists between the RFID chip/tag and a signal transmitter. In various embodiments, multiple RFID chips/tags will exist at different sensors or sprinklers throughout the system at various points along a network of pipes. The sensors or sprinklers may each be capable of one or two way communication with a base station (also referred to herein as a local processing unit or LPU) as long as the distance between base station and sensor or sprinkler is not greater than a particular threshold (e.g., 1000 feet). The threshold may vary depending on many factors, including noise in the pipes, number of turns or bends in the pipe, type of pipe or coating on the pipe, size of pipe, frequency of the communications signals, whether the RFID chips/tags are passive, hybrid, or active, and/or other factors.

Sensors within the pipe system can be monitored for corrosion as well. For example, some embodiments relate to the remote monitoring of corrosion, including the current level of the corrosion and the rate of corrosion, of equipment in a corrosive environment. The equipment being monitored can be, for example, pipes in piping systems (e.g., in fire protection sprinkler systems), which are pervasive in a variety of businesses, from restaurants to hotels. The level of the corrosion of a piece of equipment can relate to the amount of corrosion the equipment has experienced (e.g., weight loss per area, loss of thickness of the metal, or some other measure of corrosion). In addition, measuring the rate of corrosion will help predict when a portion of the equipment (e.g., pipe walls) will be so thin that there is high likelihood of failure, e.g., leaks, and/or there could be a buildup that can cause blockage. Thus, measuring the rate of corrosion gives the user or business time to schedule maintenance instead of performing emergency maintenance on the piping systems. Accordingly, collecting the level of the corrosion and the corrosion rates can be used notify the user or business of potential problems (e.g., blockages and/or leaks in the pipes) caused by the corrosion.

FIG. 1A depicts an example pipe 150 through which a wave 155 can be passed. The head end of the system includes an RFID reader (which can a signal transmitter and a signal receiver, for example, as well as a transceiver) that transmits signals at a designed microwave frequency for the pipe system. The RFID reader of FIG. 1A includes an RF injector/receiver type transceiver attached to the dry pipe system. In FIG. 1A, the head end of the system is an LPU 235. The RF injector/receiver may be, for example, an antenna of the LPU 235 configured to transmit signals into the pipe 150. The LPU 235 includes the RF injector/receiver to transmit and/or receive RF signals to and from a detector 130 and/or a fluid distribution device 110. The RFID reader in the LPU 235 is able to communicate with the detector 130, the fluid distribution device 110, and/or any additional device in the system.

Systems described herein can include various numbers of pipes 150, detectors 130, and fluid distribution devices 110. Each of the detectors and fluid distribution devices of a system can have an RFID chip that has an individually unique RFID chip/tag identifier. In this way, the system can monitor and keep track of specific devices, readings, and/or states, for example. If a particular sprinkler head takes a temperature reading, the status of that temperature reading can command an activation of that sprinkler head, either through communication with the LPU 235 or through programmable and machine-executable logic that exists at the sprinkler head. By communicating a signal back the LPU 235 indicating a state and a location (e.g., using the unique RFID chip/tag identifier), the LPU 235 (and subsequently the system as a whole) can identify information about that sprinkler head, including the temperature reading and/or whether the sprinkler head has been activated. The RFID reader (and LPU 235, generally) can be connected to other systems so that the status of the dry pipe system can be monitored remotely.

An antenna 160 can partially extend into the pipe 150. The antenna 160 may be part of an RFID transceiver, and may be integrated onto an RFID chip/tag. In this way, the wave 155 in the pipe can be captured and read. The antenna itself can extend into the pipe so that waves within the pipe can be received and waves can be transmitted into the pipe. The antenna 160 can be arranged in the pipe 150 so that it does not substantially impede the flow of any fluid through the pipe 150. For example, the antenna 160 may be a small wire or wire loop extending into a pipe 150. In some embodiments, the antenna 160 can also include an RFID chip/tag. Wiring 165 and 170 electrically connects the antenna 160 to the fluid distribution device 110 and the detector 130. The detectors and fluid distribution devices may have separate antennas. In some embodiments, devices that have interfaces to the inner parts of the pipe 150 may have an antenna 160 built into them. For example, the fluid distribution device 130 could have an antenna formed integrally therein that is exposed to the inside of the pipe 150, and therefore can send/receive signals, including the wave 155 through the pipe. The fluid distribution device 110 and the detector 130 can also send signals through the wiring 165 and 170 to the antenna 160 to send signals back through the pipe to the LPU 235. In this way, two way communications are possible as well.

The pipe 150 may be made of specific material to maximize the waveguide efficiency. For example, pipes made out of metal or having an inner or outer coating of metal may better contain a signal within the pipe. Signals within the pipe may have a particular frequency based on a material of the pipe and/or coating, the position of a coating (e.g., whether the coating is on the inner or outer surface of a pipe), or the thickness of a coating and/or pipe.

The system can use the microwaves to power the devices 110 and 130. Power from the microwaves may be used for charging a battery or super capacitor of various types, for example. In some embodiments, RFID chips/tags may be passive, semi-passive (e.g., battery-assisted passive or hybrid), and/or active. An active RFID chip/tag can have a battery or super capacitor that powers the transmission from the RFID chip/tag (e.g., sending a signal indicating a status of a sensor or sprinkler associated with the RFID chip/tag). As discussed herein, the RFID chip/tag may charge its battery or super capacitor based on RF signals received at the RFID chip/tag. In semi-passive (battery-assisted or hybrid) RFID chips/tags, the RFID chip/tag can have a battery, but the circuitry of the RFID chip/tag is only activated in the presence of an RFID reader (e.g., when the RFID chip/tag receives an RF signal from the RFID reader). In a passive RFID chip/tag, no battery is present, and the RFID chip/tag can use the radio energy from the RFID reader signals to power any sensors, actuators, etc. and transmit any communications back to the RFID chip/tag. Different combinations of components, active, passive, and semi-passive RFID readers and chips/tags may be used.

Figure 1B:
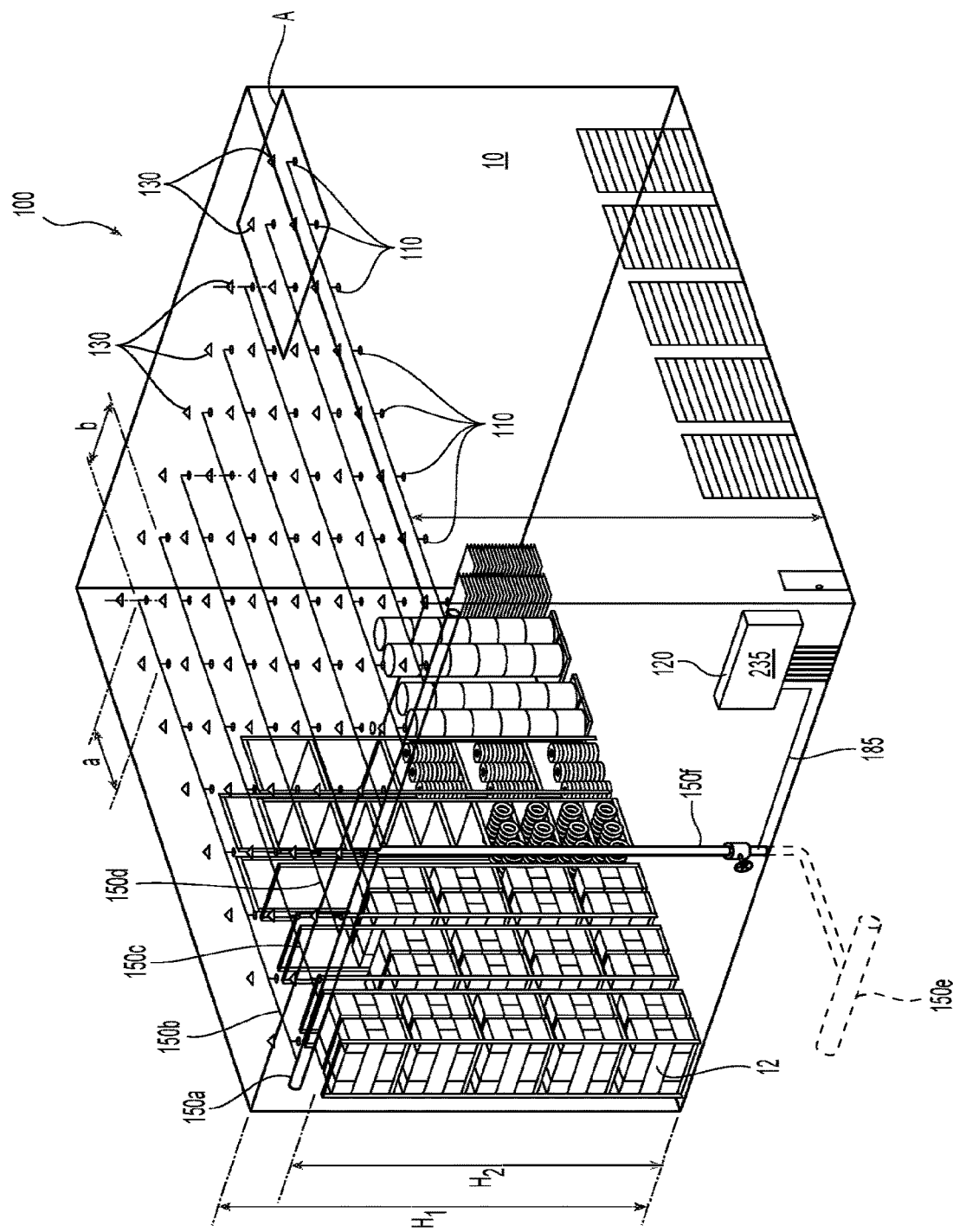
FIG. 1B is a perspective view of a fire protection system.
Figure 2:
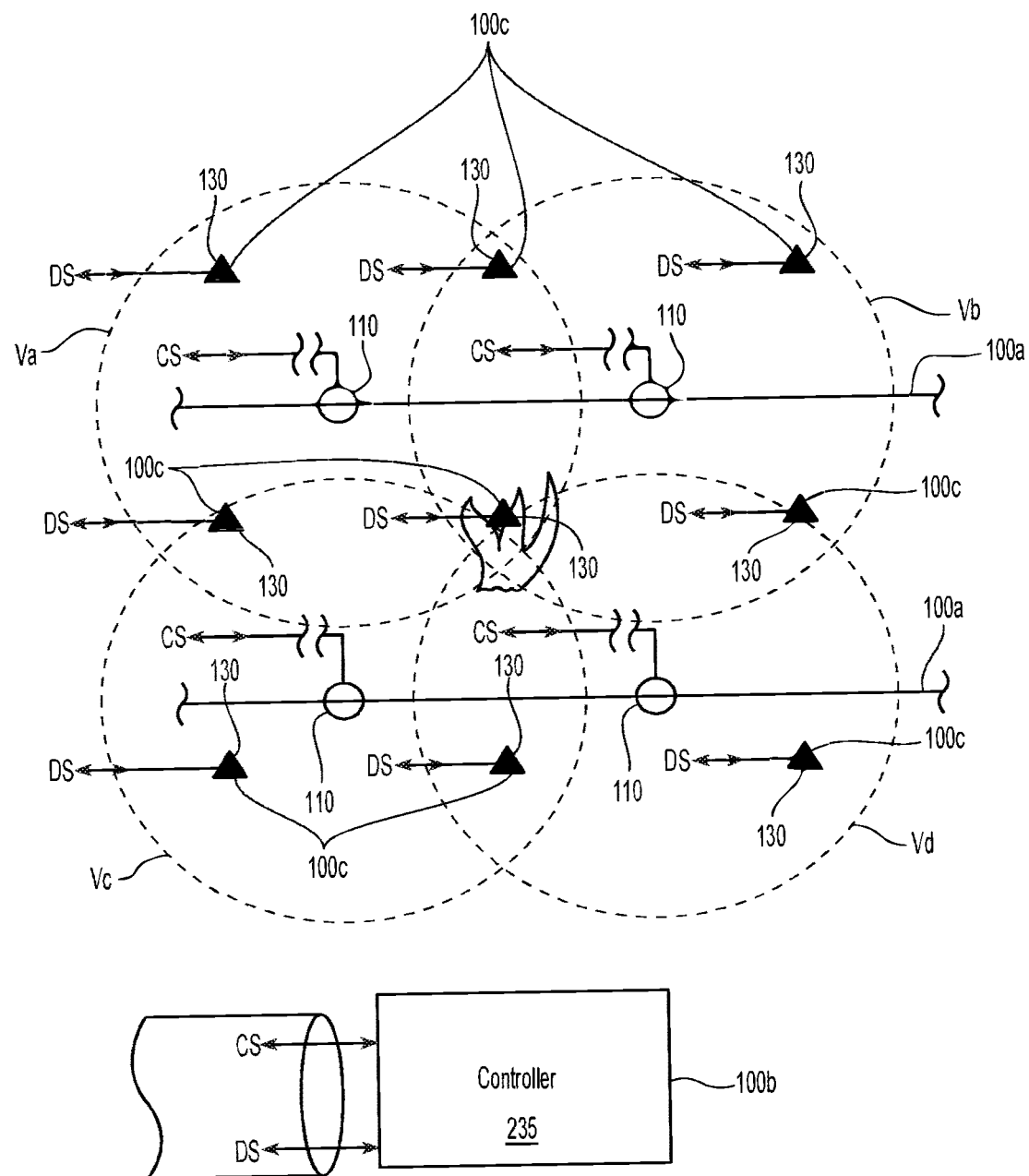
FIG. 2 is a schematic view detailing operation of a fire protection system.

An example of a fire protection system 100 for the protection of a storage occupancy 10 and one or more stored commodities 12 is depicted in FIGS. 1B and 2. The fire protection system 100 can: (i) detect the presence and location of a fire; and (ii) respond to the fire at a threshold moment with a controlled discharge and distribution of a volumetric flow of firefighting fluid, such as water, over the fire to effectively address and/or quench the fire. Fluid distribution devices 110 can be coupled to and spaced about the fire protection system 100 to deliver a controlled amount of firefighting fluid into a location where a fire has been detected. In the fire protection system 100, as will be described in additional detail herein, the various functions of the fire protection system 100 can be carried out using RF signals that pass through the pipes of the fire protection system 100.

The fire protection system 100 depicted in FIG. 1B includes a fluid distribution sub-system 100a, a control sub-system 100b, and a detection sub-system 100c. The sub-systems 100a, 100b, 100c can work together to identify and address (e.g., quench) fires occurring within the storage occupancy 10, as depicted in FIG. 2. The fluid distribution and control sub-systems 100a, 100b can work together. For example, the control sub-system 100b and fluid distribution sub-system can communicate one or more control signals CS. The control signals CS can correspond to one or more commands that initiate and execute controlled operation of selectively identified fluid distribution devices 110 defining a discharge array to deliver and distribute the volumetric flow V of firefighting fluid throughout the site of a detected fire F in order to effectively address and/or quench the fire.

The CS signals can include signals sent from the fluid distribution devices 110. For example, the one or more fluid distribution devices 110 may send control signals CS indicating a state of the fluid distribution device(s) 110 (e.g., sprinkler valve is open, sprinkler valve is closed). The parameters of the volumetric flow V can be defined by a collection of distributed discharges Va, Vb, Vc, and Vd. The detection sub-system 100c, along with the control sub-system 100b, can determine directly or indirectly, (i) the location and magnitude of a fire F in the storage occupancy 10; and (ii) which of the fluid distribution devices 110 should be activated in the controlled operation to address the fire F. The detection and control sub-systems 100b, 100c can work together by communicating one or more detection signals DS to detect and locate the fire F. The detection signals DS may also be two-way communication signals. For example, a temperature sensor may have an RFID chip that is pinged by an RFID reader to output a temperature reading and transmit the temperature reading back to the RFID reader. The fire protection system 100 also utilizes the pipes 150 as waveguides as disclosed herein. As depicted in FIG. 1B, the LPU 235 is coupled to wiring 185 that carries signals transmitted into and received from the pipe 150f. In addition, as shown in FIG. 2, the control signals CS and detector signals DS are inputted and received through the pipe 150. At pipe 150f, the wiring 185 includes an antenna 160 that extends into the pipe 150f, so that control and detection signals CS, DS may be sent and received through the pipes 150 in the fire protection system 100 as disclosed herein.

The fluid distribution devices 110 and the detectors 130 may communicate with each other, as well as with the controller 235 (also referred to herein as a local processing unit or LPU). For example, if the fluid distribution devices 110 and the detectors 130 are associated with an active or semi-passive RFID chip/tag, the fluid distribution devices 110 and the detectors 130 can transmit and/or receive communications with other devices. By having active or hybrid communication devices, the system may act in a more decentralized manner. A more decentralized system 100 may enable continued system 100 operation if, for example, a fire destroys a section of pipe and prevents the LPU 235 from communicating with a detector 130. Although the detector 130 may not communicate directly with the LPU 234, the detector 130 may still be within range of another detector 130, which creates another possible path of communication with the LPU 235. Accordingly, the detector out of range of the LPU 235 could communicate with the second detector, which could then report back to the LPU 235 a status or reading regarding the detector that was otherwise unreachable to the LPU 235. The pipes of the fire protection system 100, which guide communication through the system 100, may be constructed such that there are multiple paths to communicate with any given device. Redundancies in communication paths can allow the system to operate even when some damage (e.g., fire damage, corrosion) has occurred.

The detection sub-system 100c can include a plurality of detectors 130 disposed beneath the ceiling and above the commodity 12 in support of the fire protection system 100. In some embodiments, detectors 130 may be located in any other location in addition to beneath a ceiling and above a commodity 12. The control sub-system 100b includes the LPU 235 that can communicate with the detectors 130 and fluid distribution devices 110 for the controlled operation of any identified group of devices 110 (e.g., those devices 110 that are near a detected fire).

Figure 8A:
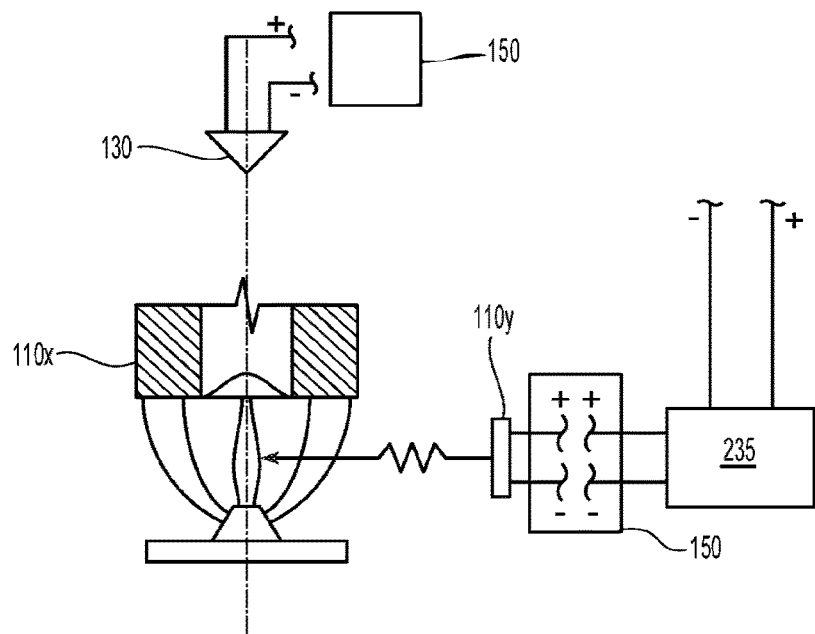
FIGS. 8A and 8B are schematic views of fluid distribution devices for use in a fire protection system.
Figure 8B:
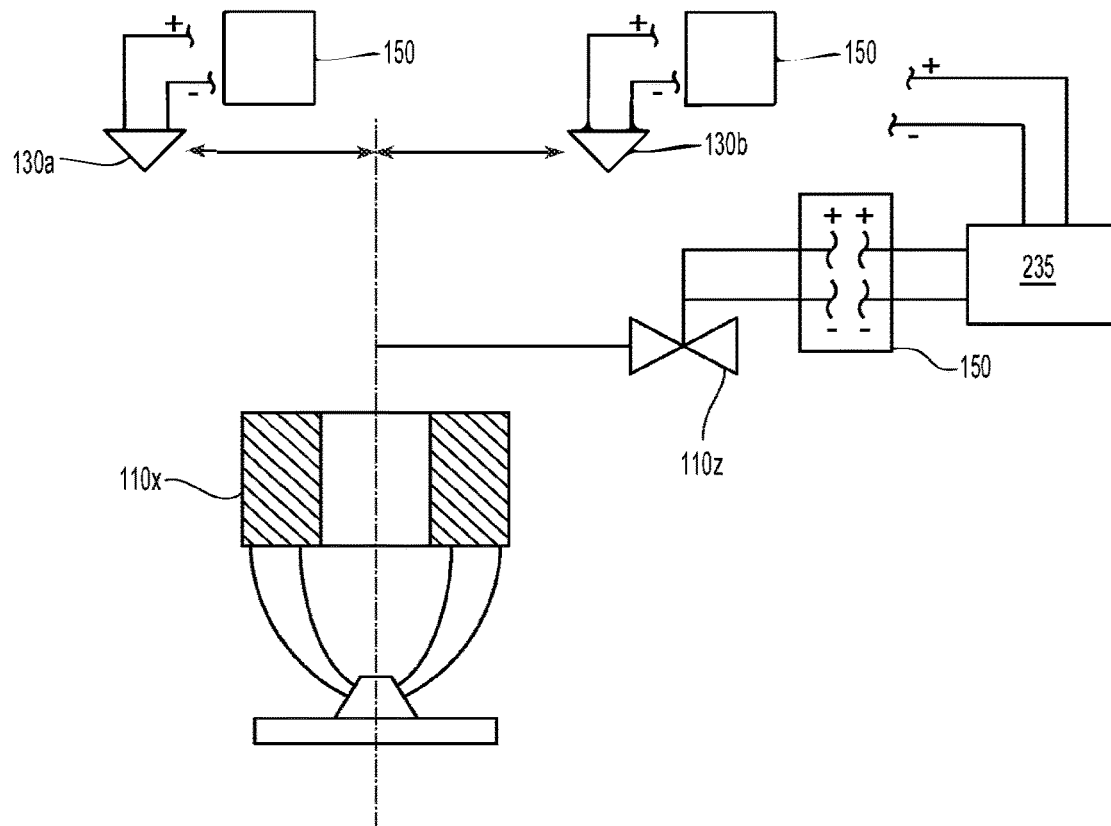

The detectors 130 of the detector sub-system 100c can monitor the occupancy 10 to detect changes in temperature, thermal energy, spectral energy, smoke and/or any other parameters that indicate the presence of a fire in the occupancy 10. Each measurement can be communicated through the pipes 150 of the fire protection system 100 as discussed previously. The detectors 130 can include thermocouples, thermistors, infrared detectors, and/or smoke detectors, for example. In some examples, the detectors 130 for use in the system include TrueAlarm® Analog Sensing analog sensors from SIMPLEX, TYCO FIRE PROTECTION PRODUCTS. As depicted in FIG. 1B, the one or more detectors 130 are disposed proximate the fluid distribution device 110 and below and proximate to the ceiling C. The detectors 130 can be mounted axially aligned with the sprinkler 110, (as schematically depicted in FIG. 8A) or above and offset from the distribution device 110 (as schematically depicted in FIGS. 2 and 8B). The detectors 130 can be located at the same or any differential elevation from the fluid distribution device 110. As previously indicated, the detectors 130 can be capable of communicating wirelessly with the LPU 235 using the pipes 150 as waveguides. The detectors 130 can communicate detection data or signals to the LPU 235 of the system 100 for processing as well. The ability of the detectors 130 to monitor environmental changes indicative of a fire can depend upon the type of detector being used, the sensitivity of the detector, coverage area of the detector, and/or the distance between the detector and the fire origin. The detectors 130 individually and collectively can be appropriately mounted, spaced and/or oriented to monitor the occupancy 10 for the conditions of a fire in a manner described.

The fluid distribution subsystem 100a can include a network of pipes 150 having a portion suspended beneath the ceiling of the occupancy and above the commodity to be protected. As depicted in FIG. 1B, the network of pipes 150 can include one or more main pipes 150a from which one or more branch lines 150b, 150c, 150d extend. The distribution devices 110 can be mounted to and spaced along the spaced-apart branch pipes 150b, 150c, 150d to form a desired device-to-device spacing a×b. The piping can be arranged to satisfy the hydraulic demand of the system and the operational fluid requirements of the distribution devices 110. A detector 130 can be disposed above and axially aligned with each distribution device 110. The distribution devices 110, branch lines 150b, 150c, 150d and main pipe(s) 150a can be arranged so as to define either one of a gridded network or a tree network. The network of pipes 150 can further include pipe fittings such as connectors, elbows, and risers, etc. to interconnect the fluid distribution portion of the system 100 and the fluid distribution devices 110. The RF signals and/or microwaves disclosed herein can travel in through the pipe systems regardless of any connectors, elbows, risers, etc. that are used. The various components used and their configurations may impact the distance that a signal may travel within the pipes while maintaining signal integrity and/or power, and may impact a frequency used for the signals.

The network of pipes 150 connects the fluid distribution devices 110 to a supply of firefighting fluid such as, for example, a water main 150e or water tank. The fluid distribution sub-system 100a can also include additional devices (not shown) such as, for example, fire pumps or backflow preventers to deliver the water to the distribution devices 110 at a desired flow rate and/or pressure. The fluid distribution sub-system 100a further includes a riser pipe 150f which extends from the fluid supply 150e to the pipe mains 150a. The riser 150f can include additional components or assemblies to direct, detect, measure, and/or control fluid flow through the fluid distribution sub-system 110a. Measurements of sensors and instructions to actuate valves or other devices may all be communicated through the pipes 150. For example, the system can also include a flow meter for measuring the flow through the riser 150f and the system 100, and the flow meter may communicate its measurement to the LPU 235 using the pipes 150 as a waveguide. The fluid distribution sub-system 100a and the riser 150f can also include a fluid control valve that may be controlled using RF signals that pass through a pipe 150 (e.g., a differential fluid-type fluid control valve). A fire protection system 100 may include more than one LPU 235 located at various locations throughout the system 100. The LPUs 235 may communicate with one another. The LPUs 235 may be assigned to communicate throughout the occupancy 10 with a subset of the distribution and detection devices 110, 130 in a system 100. A particular distribution or detection device 110, 130 may be configured to communicate with only a single LPU 235 or configured to communicate with more than one LPU 235 to provide additional communication paths and redundancy to the system 100.

Figure 3:
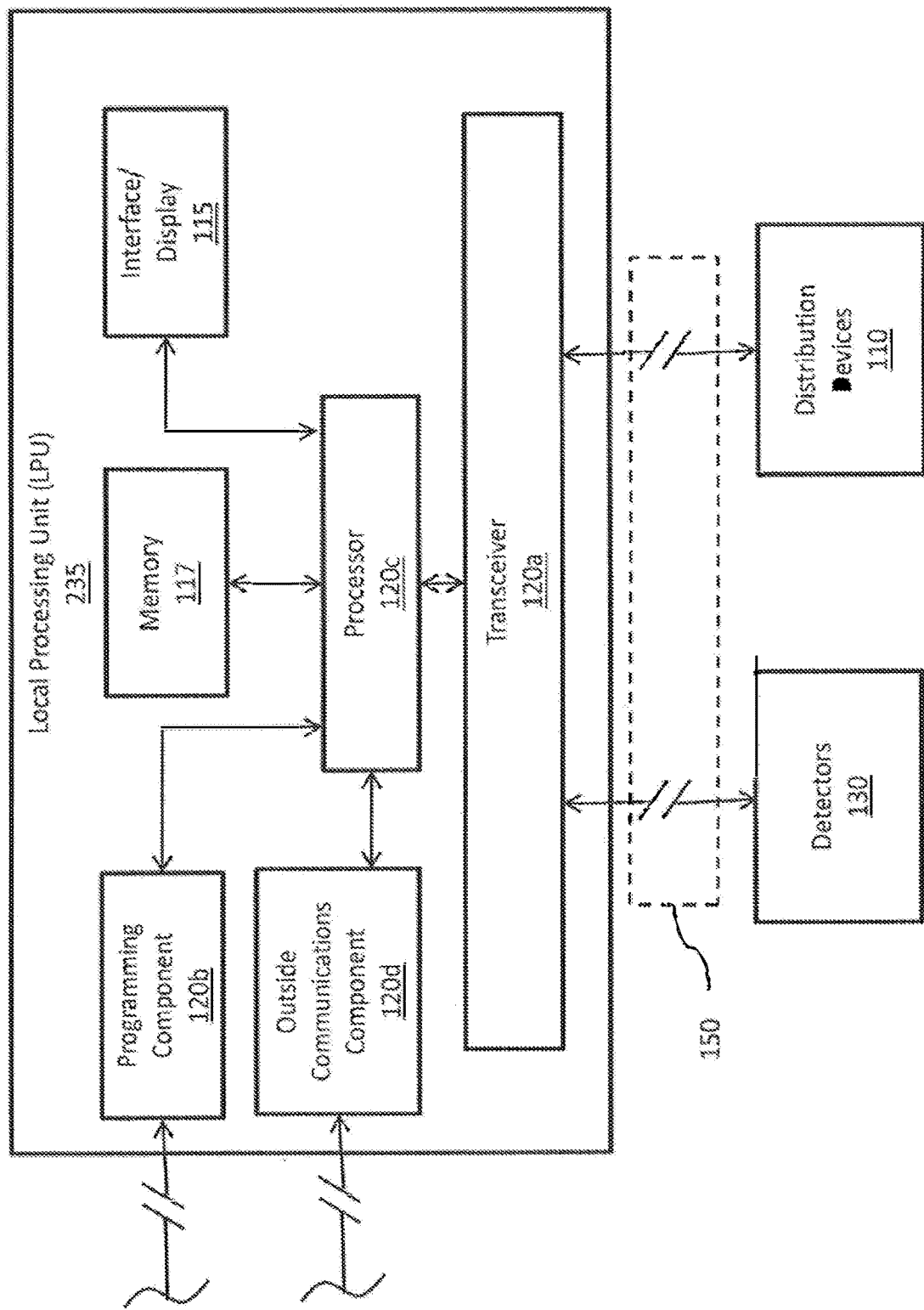
FIG. 3 is a schematic view of a controller arrangement for use in a fire protection system.

The LPU 235 is depicted in FIG. 3. The LPU 235 can receive and process the various input signals and generate output signals from and/or to each of the detectors 130 and fluid distribution devices 110 through the pipe 150. Functionally, the LPU 235 includes a transceiver 120a (e.g., an RFID reader), a programming component 120b, a processor 120c and an outside communications component 120d. The outside communications component 120d may, for example, communicate with a gateway 400 (described below and shown in FIG. 15) or any of the components shown in FIG. 14 and described below (including the monitoring platform 230 described further with respect to FIG. 16. The transceiver 120a sends and receives data and/or signals to and from the detectors 130 and the distribution devices 110. For example, the transceiver 120a can send either raw detector data or calibrated data, including continuous or intermittent temperature data, spectral energy data, smoke data or the raw electrical signals representing such parameters, (e.g., voltage, current, or digital signal). Additional data parameters collected from the detectors 130 and distribution devices 110 can include time data, address or location data of the detector 130, location of a detector or distribution device 130, 110, flow through a distribution device 110, or a state of a distribution or detector device 110, 130. These communications can pass through the pipe system 150 as disclosed herein. The programming component 120b provides for input of user-defined parameters, criteria or rules that can define detection of a fire, the location of the fire, the profile of the fire, the magnitude of the fire and/or a threshold moment in the fire growth. The programming component 120b can also provide for input of select or user-defined parameters, criteria, or rules to identify fluid distribution devices or assemblies 110 for operation in response to the detected fire. For example, the programming component 120b can define relationships between distribution devices 110 (e.g., proximity, adjacency, etc.), define limits on the number of devices to be operated (i.e., maximum and minimums, the time of operation, the sequence of operation, pattern or geometry of devices for operation, their rate of discharge), and/or define associations or relationships to detectors 130. The parameters used by the programming component 120b may be determined from signals received from other LPUs 235, which may be received through the piping of the fire protection system 100. The various operational parameters, including information received from the detectors 130 and/or the distribution devices 110, can be stored in a memory 117. The memory 117 may also include instructions stored thereon that can be implemented by the processor 120c. The memory 117 and/or other memories described herein may also be described as a non-transitory computer readable medium on which instructions can be stored. The instructions may be carried out or executed by a computing device such as the LPU 235, including the processor 120c and the transceiver 120a. The LPU 235 also includes an interface/display 115 through which a user may interact with the data stored in the memory, check statuses of the fluid distribution devices 110 and the detectors 130 (using signals transmitted through the pipe 150), or perform other functions.

The processor 120c processes the input and information from the transceiver 120a and programming component 120b to first detect and locate a fire, and then select, prioritize and/or identify the fluid distribution devices 110 for controlled operation to address the fire. For example, the processor 120c can determine when a threshold moment is achieved. Upon determining a threshold moment has been achieved, the processor 120c generates appropriate signals to control operation of the identified and addressable distribution devices 110. Signals to control the operation can be sent via the transceiver 120a. The programming may be hard wired or logically programmed and the signals between system components can be analog, digital, and/or fiber optic data. In some embodiments, the logic that determines when a threshold moment is achieved can be located at the detectors 130 or distribution devices 110. In various embodiments, the detectors 130 and/or distribution devices 110 may also trigger a change in state based on the threshold moment being achieved without receiving instruction to do so from the LPU 235. The detectors 130 and/or distribution devices 110 can still send a signal to the LPU 235 through the pipes 150 that the threshold moment is achieved and/or that one of the devices has changed states.

The LPU 235 can be a part of a communication system that includes an RFID tag that is associated with one of the detectors 130 and/or distribution devices 110. For example, the LPU 235 can include components of an RFID reader. An RFID reader may utilize aspects of the transceiver 120a, the processor 120c, and the memory 117 to communicate with various RFID tags/chips at the detectors 130 and/or distribution devices 110. The RFID reader of the LPU 235 communicates with RFID tags via RF signals. At least one pipe 150 can extend between the RFID tag and the RFID reader, which can be a part of a fire protection system 100.

The pipe 150 can have fluid flow through it for purposes of controlling a fire, while also serving as a waveguide that can guide the RF signal through the pipe 150 between the RFID tag and the RFID reader. The RF signals can be microwave signals. For example, microwaves having a frequency in a range from about 1 GHz to 3.5 GHz can be used. Specifically, microwaves of approximately 1 GHz, approximately 1.25 GHz, approximately 1.5 GHz, approximately 1.75 GHz, approximately 2 GHz, approximately 2.25 GHz, approximately 2.5 GHz, approximately 2.75 GHz, approximately 3 GHz, approximately 3.25 GHz, and/or approximately 3.5 GHz can be used. The pipes 150 through which the microwave signals pass can have an approximately circular cross section and can have an inner diameter that is in a range from about 1 inch to 8.5 inches. For example, the inner diameters of the pipes 150 may be in a range from about 2 inches to 6.5 inches. As specific examples, inner diameters of the pipes may be approximately 1 inch, approximately 1.5 inches, approximately 2 inches, approximately 2.5 inches, approximately 3 inches, approximately 3.5 inches, approximately 4 inches, approximately 4.5 inches, approximately 5 inches, approximately 5.5 inches, approximately 6 inches, approximately 6.5 inches, approximately 7 inches, approximately 7.5 inches, approximately 8 inches, and/or approximately 8.5 inches.

The RFID tag can include an antenna 160 that is used to receive and transmit RF signals. The RFID tag can also include a processing circuit operatively connected to the antenna and configured to modulate and/or demodulate the RF signals. The RFID tag can include a power circuit operatively connected to the processing circuit and configured to collect power from signals received by the antenna 160. The antenna 160 extends into a pipe 150 of a fire protection system 100, and the pipe 150 is configured for fluid to flow therein. The pipe 150 is also configured to be a waveguide such that the RF signals are guided by the pipe 150 to and from the antenna 160.

The RFID tags may include one or more sensors including a temperature sensor, pressure sensor, flow rate sensor, smoke detector, thermal energy sensor, spectral energy sensor, thermocouple, thermistor, infrared detector, gas detector, combustible gas sensor, photoionization detector, infrared point sensor, ultrasonic sensor, electrochemical gas sensor, semiconductor sensor, corrosion monitoring sensor, and/or sprinkler activation sensor. The RFID reader of the LPU 235 can send an RF signal to an RFID tag, and the RFID tag utilizes power from the RF signal to power the sensor(s). In response to the RF signal, the RFID tag sends a second RF signal to the RFID reader, and the second RF signal is associated with a measurement value of the sensor. In this way, the sending of the second RF signal can be powered at least in part by power from the RF signal received from the RFID reader. The RF signal may also help charge a battery and/or a super capacitor of the RFID tag.

RFID tags at the detectors 130 and/or distribution devices 110 can also include a memory, a processor operatively coupled to the memory, and a set of instructions stored on the memory, which can be executed by the processor to cause the processor to perform certain functions. For example, certain RFID tags may have their own software or logic stored on their memory that can be executed by the RFID tag's processor. For example, a detector 130 may be programmed to determine an output of a sensor (e.g., temperature) that indicates a state of an environment at or near the RFID tag. Additionally, the RFID tag may be programmed to send that measurement value to the RFID reader if it, for example, reaches a predetermined threshold.

In another example, the RFID tag may be requested to send a signal to the RFID reader indicating a state of a device (e.g., is sprinkler open or closed). In response to any of the signals sent from the RFID tag, the LPU 235 may decide to activate a sprinkler head, and may send another RF signal with an instruction for a sprinkler head to actuate/activate.

RF communications can be continuously transmitted and received between the detectors 130, fluid distribution devices 110, and LPUs 235. In this way, sensors and distribution devices 110 may be continually monitored. Corrosion monitoring devices can monitor and communicate with the fire protection system 100 as well. An example of a corrosion monitoring device is described in more detail in commonly-owned U.S. Provisional Patent Application No. 62/620,590, filed on Jan. 23, 2018 and entitled "Apparatus and Method for Remote Monitoring of Equipment," which is hereby incorporated by reference in its entirety.

Existing LPUs may be modified to function like the LPU 235 shown in FIG. 3 and described herein. For example, an existing LPU may have a transceiver 120a added that communicates with the processor 120c and extends an antenna (e.g., antenna 160, shown in FIG. 1) into the pipe 150 so that it can communicate with detectors 130 and distribution devices 110.

Figure 4:
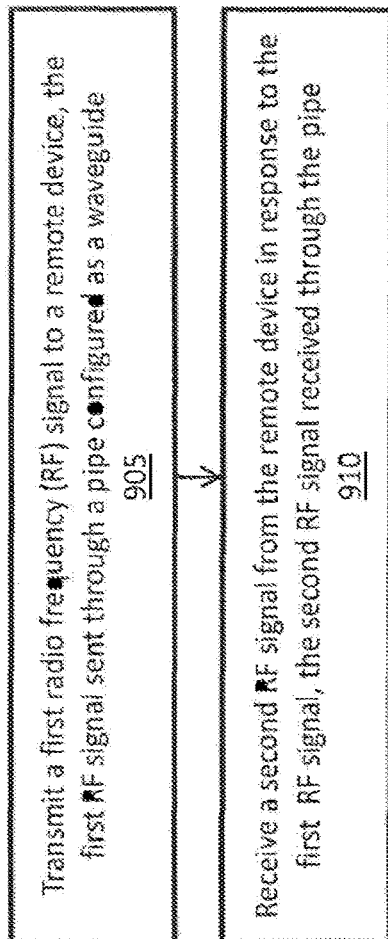
FIG. 4 is a process diagram of a method of transmitting and receiving RF signals at an LPU.

FIG. 4 depicts a method 900 for transmitting and receiving RF signals at an LPU. At step 905, an LPU (e.g., LPU 235) transmits a first RF signal to a remote device (e.g., a detector device 130 or a fluid distribution device 110). The first RF signal is sent through a pipe (e.g., pipe 150) configured as a waveguide. For example, an RFID reader can be pinging an RFID tag and that signal can be sent through the pipeline of a fire protection system. This signal may be a request for information from a device associated with an RFID tag about a sensor measurement or state of a device, for example, or the signal may be instructions for a device associated with an RFID tag to change states.

At step 910, the LPU receives a second RF signal from the remote device in response to the first RF signal. The second RF signal is received by the LPU through the waveguide pipe. The second RF signal is transmitted because the RFID tag received the first signal and responded with the appropriate request for information or sent confirmation of a change of state of the device associated with the RFID tag. The information may be related to a sensor, detector, state of a distribution device, and/or may include an identifier of the RFID tag to which the signal was sent. For example, the LPU may request an indication that a sensor is active, a measurement from the sensor, and/or an identification of the sensor. The sensor can send back an appropriate signal indicating it is in a working state, the value measured by the sensor, and/or information that confirms the identity of the sensor (such as a unique identifier).

Figure 5:
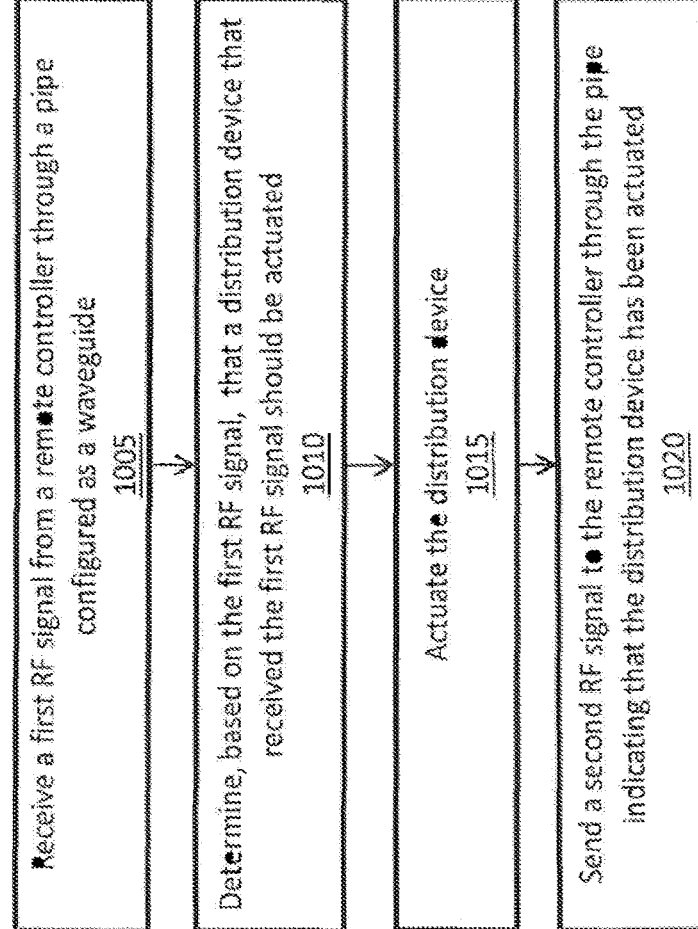
FIG. 5 is a process diagram of a method of transmitting and receiving RF signals at a distribution device.

FIG. 5 depicts a method 1000 for transmitting and receiving RF signals at a distribution device (e.g., fluid distribution device 110). At step 1005, the distribution device receives a first RF signal from a remote controller (such as an LPU 235) through a pipe (e.g., pipe 150) configured as a waveguide. The first RF signal indicates to a distribution device that the distribution device should change states. For example, if the distribution device is a sprinkler head, the first RF signal may indicate that the sprinkler head should be actuated to allow the discharge of fluid from the sprinkler head. Alternatively, if the distribution device is a sprinkler head capable of being controllably opened and closed, the first RF signal may indicate that the sprinkler head should be opened or closed to allow or prevent fluid to pass through the sprinkler head in a controlled manner. In some embodiments, a sprinkler head may also have intermediate states, such as 25% open, 50% open, and/or 75% open. In another example, the distribution device may be a pump, and the first RF signal may be a signal that indicates to the pump it should turn on or off, or should pump at a particular rate.

At step 1010, the distribution device determines that the distribution device that received the RF signal should be actuated, based on the first RF signal. The LPU may process data identifying the location of a fire. Accordingly, the LPU can send the first RF signal to a distribution device, which instructs the distribution device to actuate to address the fire. The distribution device can be a sprinkler head, for example, and the first RF signal indicates that the sprinkler head should be actuated to address a fire. At step 1015, the distribution device is activated in response to the first RF signal. At step 1020, the distribution device sends a second RF signal to the remote controller (such as the LPU) through the pipe indicating that the distribution device has been actuated (i.e., indicating the state of the distribution device). In some embodiments, the distribution device may send and/or receive RF signals to other distribution or sensor devices in addition to or instead of an LPU.

Figure 6:
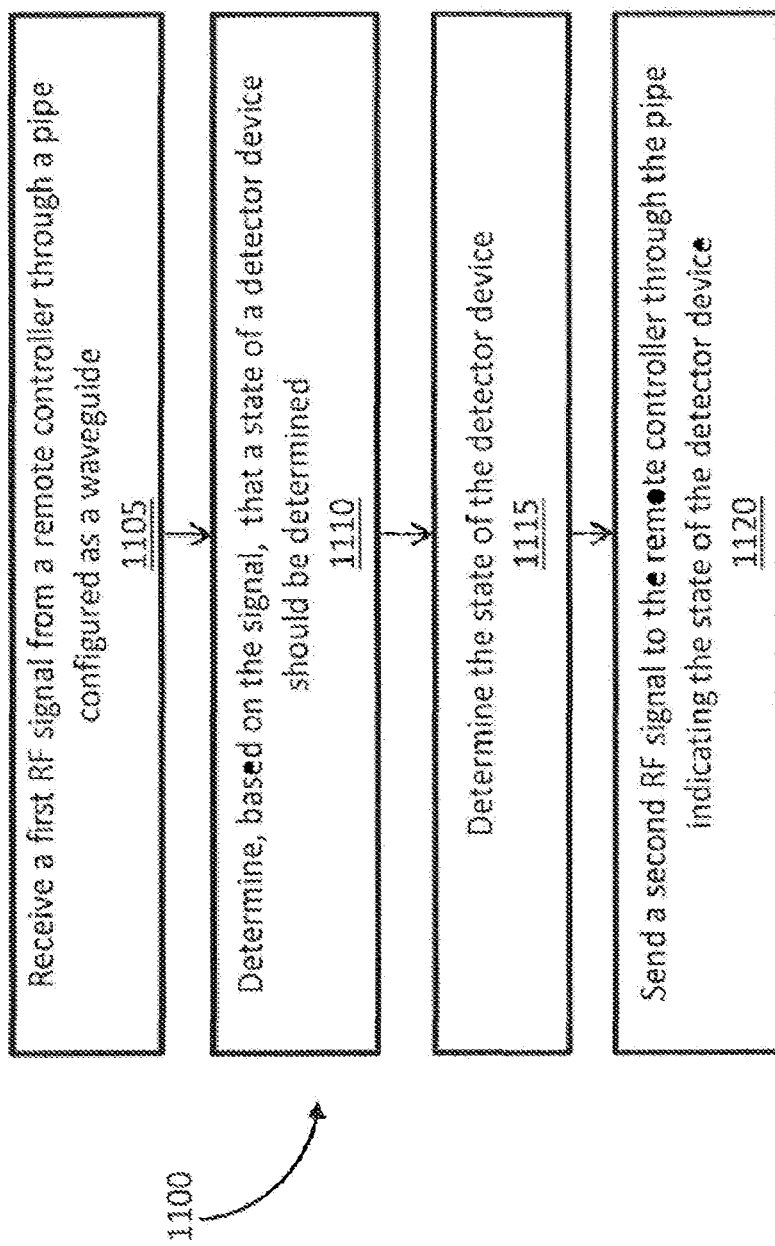
FIG. 6 is a process diagram of a method of transmitting and receiving RF signals at a detector device.

FIG. 6 depicts a process 1100 for transmitting and receiving RF signals at a detector device (e.g., detector device 130). At step 1105, a first RF signal is received from a remote controller (such as an LPU 235) at a detector device through a pipe (e.g., pipe 150) configured as a waveguide. For example, the first RF signal may indicate a request for a measurement at the sensor device such as a temperature sensor. At step 1110, the detector device determines, based on the signal, that a state of the detector device should be determined. For example, the detector can understand from the first RF signal that a temperature measurement should be taken. The first RF signal may indicate that a temperature measurement should be taken because the detector device is only a temperature sensor and the first RF signal is addressed to the temperature sensor. In another example, the detector device may include multiple sensors, but the first RF signal includes a request specifically for temperature information and an indication that the first RF signal is addressed to the detector device specifically. In other embodiments, the first RF signal may not be addressed to specific detector devices, but rather may be addressed to all detector devices or a subset of detector devices.

At step 1115, the detector device determines its state (e.g., a temperature measurement). At step 1120, the detector device sends a second RF signal through the waveguide pipe indicating the state of the detector device. The second RF signal may include additional information in addition to the state information. For example, the second RF signal may indicate an identity of the detector device. This may allow the LPU to infer a location of the detector device. In some embodiments, the second RF signal may include location information, time information, battery level information of the detector device, or any other information as disclosed herein.

Figure 7A:
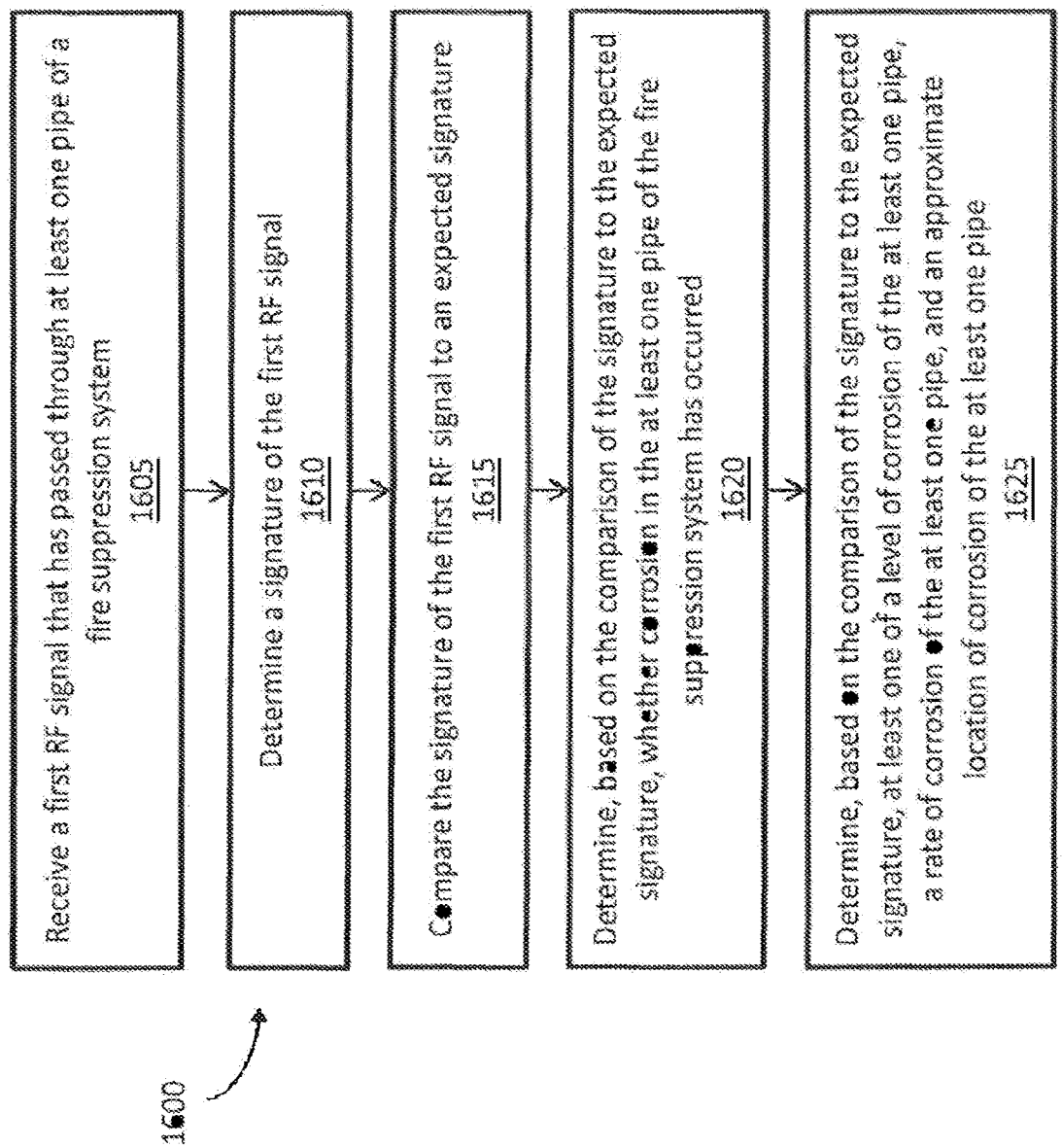
FIG. 7A is a process diagram of a method of determining corrosion in equipment of a fire protection system.

FIG. 7A depicts an operation 1600 for determining corrosion in equipment of a fire protection system (e.g., fire protection system 100). At step 1605, a first RF signal that has passed through at least one pipe of a fire protection system is received at a signal processor. The signal processor may, for example, be the processor 120c of the LPU 235 shown in FIG. 3 and described above. Accordingly, the signal processor may be at an RFID reader (because the LPU 235 includes an RFID reader). Thus, the signals received at the LPU 235 pass through at least one pipe of the fire protection system and may be used for corrosion detection.

In some embodiments, the signal processor may be located elsewhere, such as at an RFID tag/chip device (e.g., a detector device 130 or fluid distribution device 110). In these embodiments, determination of whether corrosion has occurred may be determined at devices of the system other than the LPUs. This may provide for more accurate or more localized determination of corrosion. In some embodiments, the signal processor for determining corrosion may be separate from the LPUs, the detection devices, and the fluid distribution devices. That is, the system may have a dedicated device just for receiving RF signals and using them to determine corrosion as described herein.

At step 1610, a signature of the first RF signal is determined. The signature of the first RF signal may be determined in various ways. The first RF signal may be put through various signal processing components to determine a signature. The signature may be based on a waveform of the signal. The signature may be based on certain characteristics of the waveform, such as frequency, amplitude, distortion, noise, phase, and/or other characteristics of the first RF signal. Certain mathematical algorithms may be applied to the signal or to data indicated by the signal to determine a signature of the RF signal. In some embodiments, the signature may represent the actual waveform of the first RF signal itself.

At step 1615, the signature of the first RF signal is compared to an expected signature. This signature comparison can happen in a variety of ways. The expected signature may be based on an RF signal received earlier in time. For example, the system may have already received a baseline RF signal at a first time, and determined the expected signature by determining the signature of the baseline RF signal. Then, when the first RF signal is received at a second time, the signature of the first RF signal can be compared to the expected signature determined from the baseline RF signal. In this way, the change or difference between the expected signature and the first signature can indicate that corrosion has occurred (and/or that certain levels, locations, etc. of corrosion has occurred). In an example, the expected signature may be based on several baseline RF signals. The system may determine signatures of several RF signals received over a first time period, and use those signals to determine the baseline signature. Similarly, the first RF signal may be multiple RF signals received over a second time period. These signals collected over first and second time periods can be used to determine an average expected and first signature for each time period to be compared. In other various embodiments, a plurality of baseline signals may be used to determine a baseline signature that is compared to a single signature of a single first RF signal. In some embodiments, an expected signature of a single baseline signal may be compared to a plurality of signatures of a plurality of received RF signals.

In an example of signature comparison, the expected signature is a calculated signature and is not based on a previously received signal. A calculated expected signature may be based on at least one of a size of the at least one pipe, a length of the at least one pipe, a type of fluid present in the at least one pipe, a pressure of the fluid present in the at least one pipe, a type of the at least one pipe, a coating of the at least one pipe, an expected frequency of the first RF signal, an expected amplitude of the first RF signal, an expected phase of the first RF signal, and a path shape of the at least one pipe. These various system and signal aspects can be used to determine what type of signal should be expected. Any differences between the expected signature of a signal and the actual signature of the received first RF signal can indicate corrosion or some level, location, etc. of corrosion. In another example of signature comparison, a hybrid method may be used, where the expected signature is determined both based on a prior, baseline signal and various aspects of the system and first RF signal as described above.

At step 1620, the signal processor determines, based on the comparison of the signature to the expected signature, whether corrosion in the at least one pipe of the fire protection system has occurred. In some embodiments, the determination that corrosion has occurred results when a difference in an aspect of the signature comparison reaches a predetermined threshold. For example, if a first signature is a certain threshold out of phase with an expected signature, the system may determine that corrosion is occurring. In another example, the frequency signatures may differ by a predetermined threshold. In another example, a signal may include a known message or data pattern (known to transmitter and receiver) that is corrupted in transit (i.e., passing through the pipes) indicating that corrosion is taking place.

At step 1625, the signal processor determines based on the comparison of the signature to the expected signature, at least one of a level of corrosion of the at least one pipe, a rate of corrosion of the at least one pipe, and an approximate location of corrosion of the at least one pipe. In some embodiments, a determination of a rate of corrosion of a pipe is based on a plurality of comparisons of RF signals to expected signatures over time. In other words, the first RF signal may be compared to a plurality of other signals received over time before the first RF signal was received (i.e., there are multiple baselines to compare the first RF signal to, so that a rate of corrosion can be deduced). In various embodiments, the extent and/or rate of corrosion is determined based on extrapolating or inferring an amount of corrosion based on a magnitude of the difference in signatures when performing the comparison. This magnitude may be measured whether the signature is compared to one or many expected signatures.

Figure 7B:
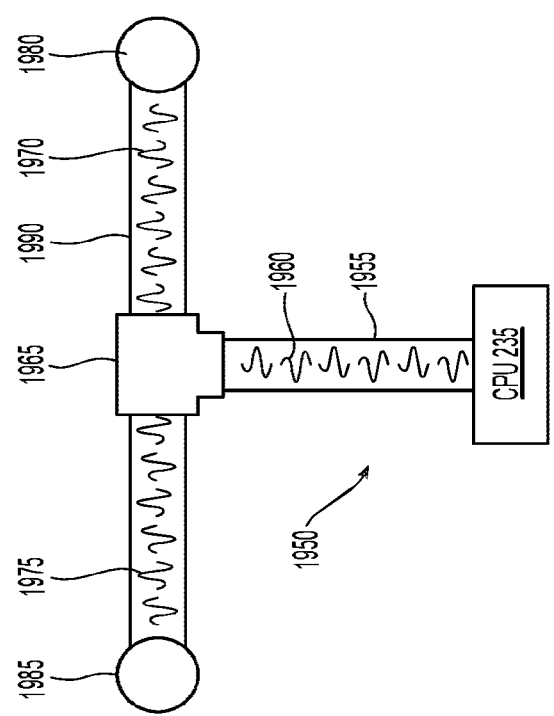
FIG. 7B is an operational view of two different paths a signal may take within a pipe system.

In various embodiments, the system may also determine from the signature comparison an approximate location of corrosion of the at least one pipe. For example, the determined approximate location of the corrosion in the at least one pipe can be indicated by a distance between a source from which the first RF signal was transmitted and a receiver where the RF signal was received. For example, FIG. 7B depicts a representative illustration of two different paths a signal may take within a pipe system 1950 in accordance with some embodiments of the present technology. The LPU 235 of the pipe system 1950 transmits a signal 1960 through the pipe 1955. The signal 1960 splits at a fitting 1965 in signals 1970 and 1975 and travel through pipes 1990 and 1995, respectively. Those pipes run to devices 1980 and 1985. Additionally, the devices 1980 and 1985 may send signals back to the LPU 235 along the same paths. A comparison of signatures to expected signatures of the two different signal paths 1970 and 1975 can indicate where in the pipe system 1950 corrosion is occurring. For example, if a comparison of a signal associated with the device 1980 and the signal 1970 demonstrates corrosion, but a comparison of a signal associated with the device 1985 and the signal 1975 does not, the system can assume that the corrosion is occurring in the pipe section 1990. If both signals show corrosion, the system knows there could be corrosion in any of the pipes 1955, 1990, or 1995. This corrosion detection method may rely on an identifier message in the RF signal that identifies a location of the source from which the RF signal was transmitted. To ensure that the path of the signal 1970 is being compared (and corrosion determined), the signal may include an identifier relating to the device 1980. In this example, the signal 1970 is transmitted from the device 1980 so that it includes an identifier of the device 1980, and the LPU 235 determines the signature of that signal knowing it has passed through the pipes 1955 and 1990. In more complex systems, combinatorial logic can be used to further deduce locations of corrosion within a pipe system. With many signals passing through various pipe section from various devices, the system can analyze them all to help pinpoint precise locations of corrosion. In some systems, a signal from a device may have more than one path back to the LPU 235. These paths may be different distances and therefore cause a signal to become more attenuated and arrive at an LPU 235 later than when the signal travels through the shorter path. These multiple signals (as received by the LPU 235) associated with (or transmitted by) a particular device, may be compared to one another to determine corrosion along some or part of the multiple paths the signals take to reach the LPU 235. In some embodiments, the comparison of signatures itself may indicate the approximate location of where corrosion is occurring. For example, a comparison of the signal 1960 in FIG. 7B may yield information that corrosion is occurring 15 feet from the LPU 235 in the pipe 1955.

The same RF and microwave signals may be used by the system for one or two way communication between LPUs and device that are used for corrosion sensing and monitoring. This efficiency of the system is advantageous and can be accomplished without implementing any hardware within the pipes themselves. Accordingly, in some embodiments, existing, older pipe systems may be monitored and used as wave guides for communications. An LPU may still be configured to send and receive signals into an existing pipe system to determine corrosion. For example, an LPU may send a signal into a pipe system and analyze its signature for corrosion when the signal is reflected back. In another example, a system may have multiple LPUs which may transmit signals to one another for communication and/or corrosion monitoring. In such an example, a first LPU may transmit a signal and a second LPU may receive it. Corrosion and an approximate location of corrosion based on the signal may be determined by the second LPU using the similar methods to those described above with respect to determining corrosion based on signals from device (e.g., sensors, sprinkler heads) within the system. In some embodiments, this signal processing could also take place at devices such as sensors and/or sprinkler heads.

A fluid distribution device 110 in accordance with various embodiments includes a fluid deflecting member coupled to a frame body as depicted in FIGS. 8A and 8B. The frame body includes an inlet for connection to the piping network and an outlet with an internal passageway extending between the inlet and the outlet. The deflecting member can be axially spaced from the outlet in a fixed spaced relation. Water or other firefighting fluid delivered to the inlet is discharged from the outlet to impact the deflecting member. The deflecting member distributes the firefighting fluid to deliver a volumetric flow which contributes to the collective volumetric flow to address and quench a fire. The deflecting member can translate with respect to the outlet to distribute the firefighting fluid in a controlled manner upon operation. The actuating portion of the fluid distribution devices 110*x* can be controlled by signals from LPUs 235 and received through pipes 150. The fluid distribution devices 110*x* can also communicate to and from the LPUs 235 through the pipes 150. Similarly, detection devices 130 can also communicate to and from the LPUs 235 through the pipes 150 as disclosed herein.

Figure 9:
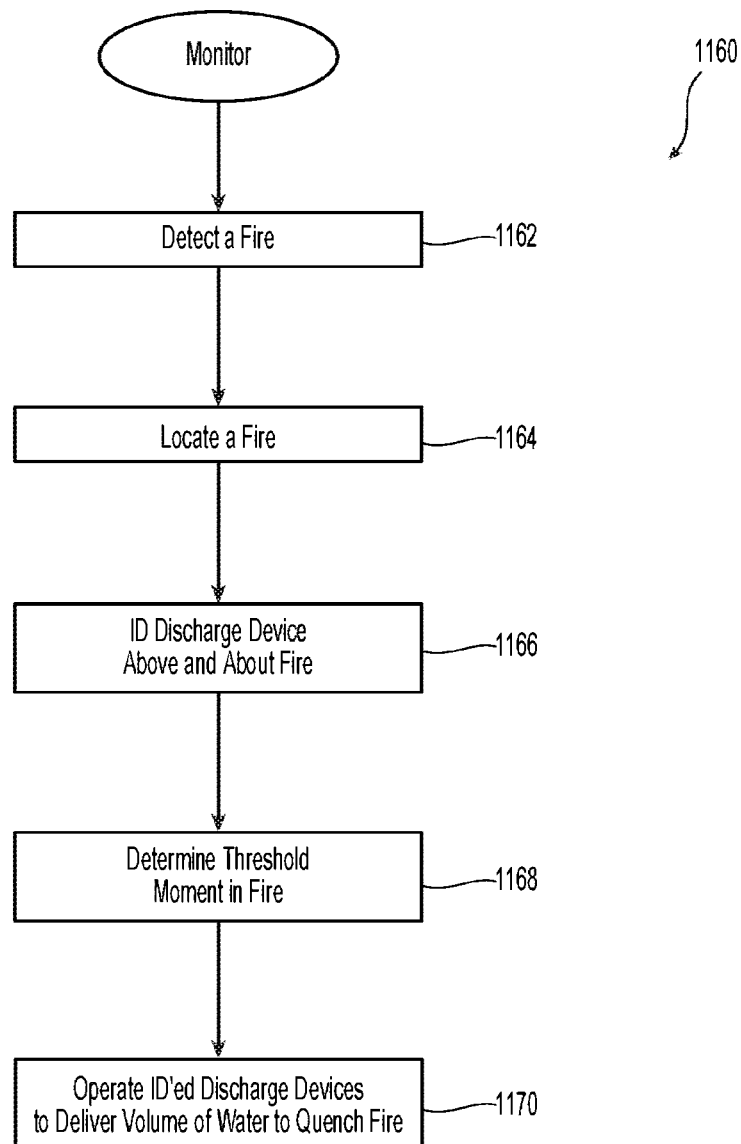
FIG. 9 is a process diagram depicting a method of actuating a distribution device.
Figure 10:
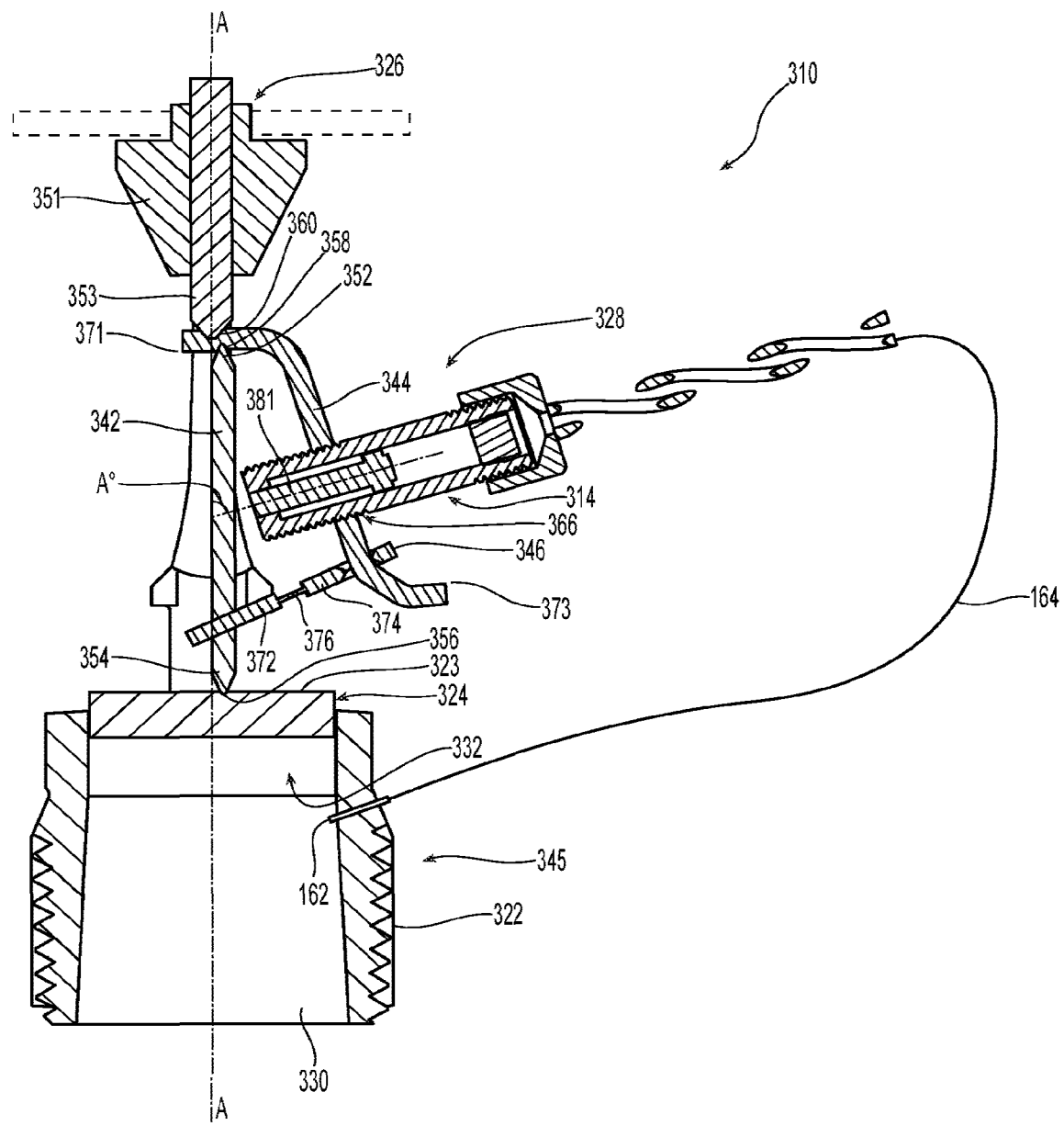
FIG. 10 is a schematic cross-sectional view of a fluid distribution device in an unactuated state.
Figure 11A:
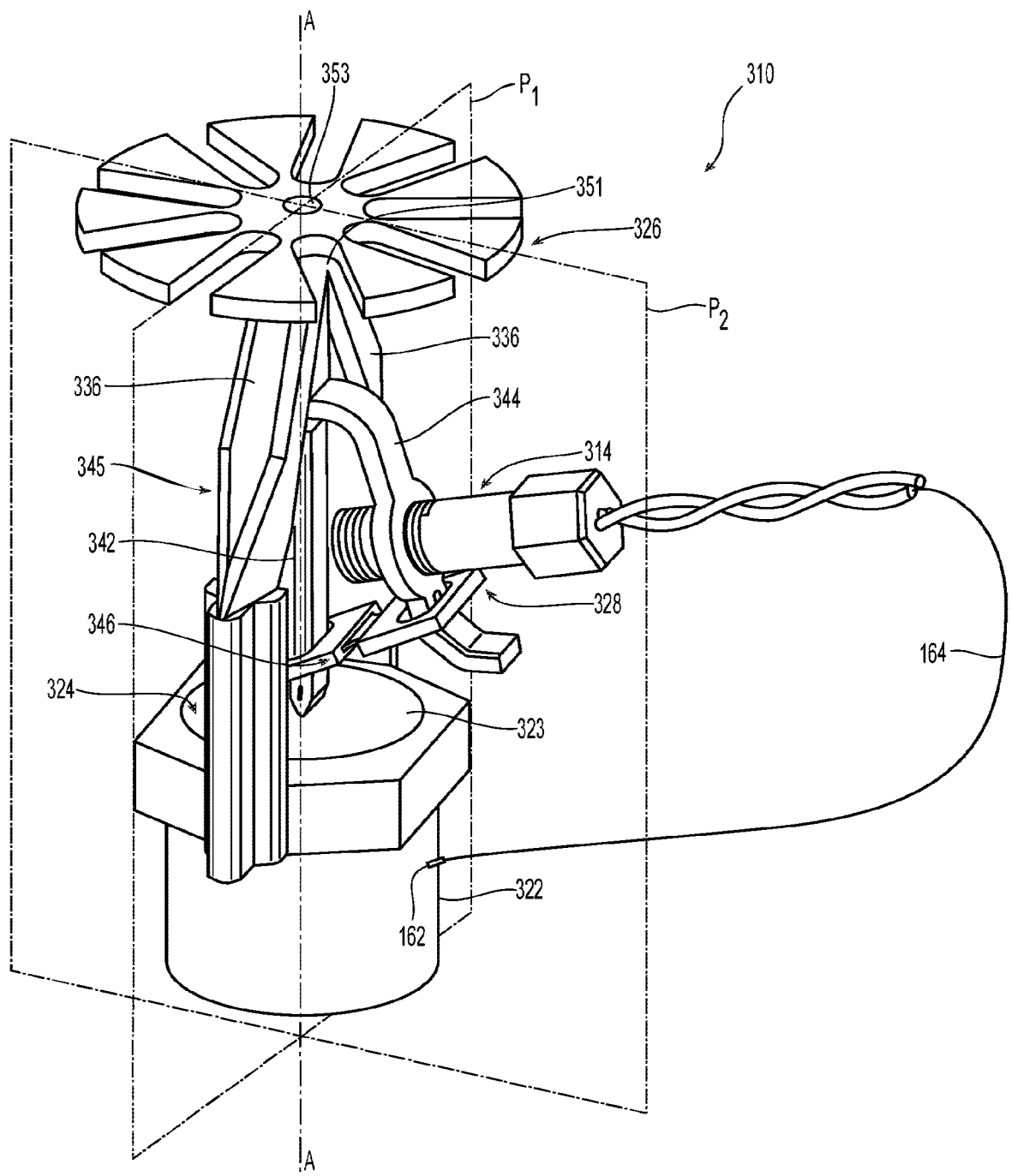
FIG. 11A is a perspective view of a sprinkler system with a sprinkler in an unactuated state.
Figure 11B:
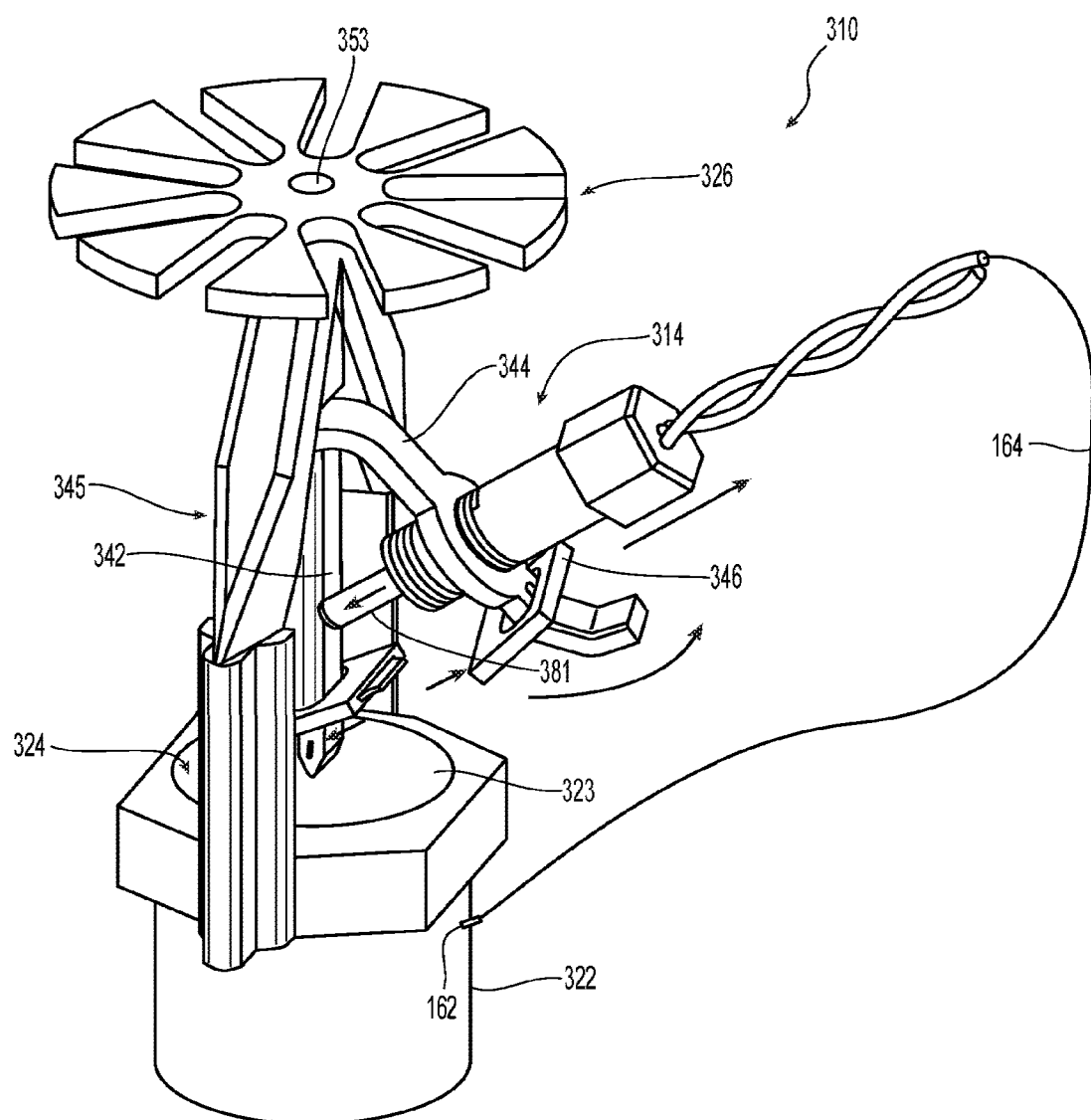
FIG. 11B is a perspective view of a sprinkler system in an actuated state.
Figure 12A:
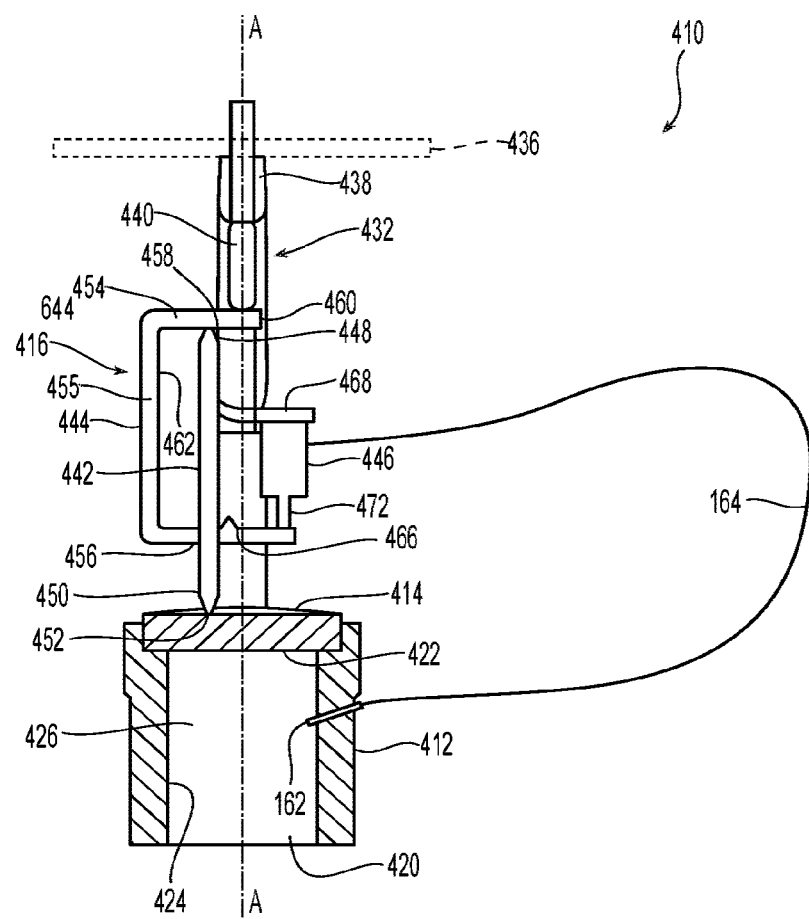
FIG. 12A is a cross-sectional view of a fluid distribution device.
Figure 12B:
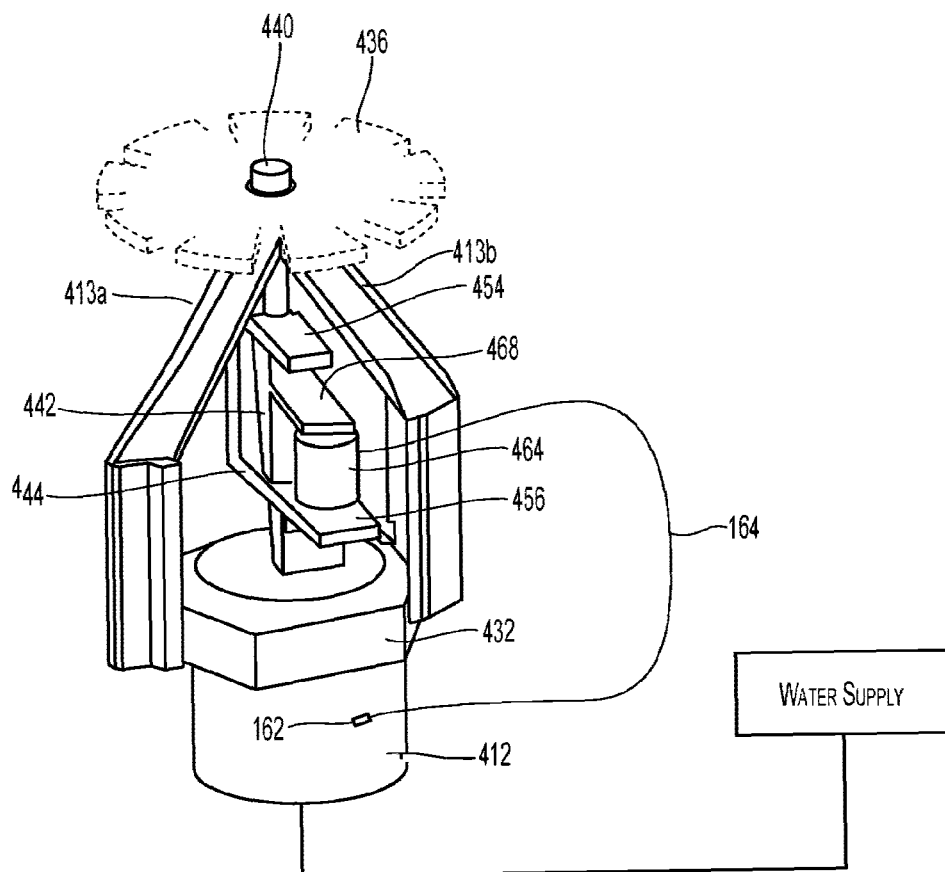
FIG. 12B is a perspective and schematic view of an installation of a fluid distribution device.

FIG. 9 depicts an operation 1160 that can be performed by the LPU 235 in the system 100. In an operative state of the system, the processing component 120c processes the input data to detect 1162 and locate 1164 a fire F. Such input data is received from detector devices 130 in the system through communications that pass through the pipe system 150 (using the pipes as waveguides) as disclosed herein. The processing component 120c, based upon the detection and/or other input data or signals from the detection sub-system 100c, identifies 1166 the fluid distribution devices 110 which define an array above and about the located fire F for controlled discharge. The processing component 120c determines a threshold moment 1168 in the fire for operation and discharge from the selected array of fluid distribution devices. In step 1170, the processing component 120c with the output component 120d appropriately signals to operate 1170 the identified fluid distribution devices for addressing and quenching the fire. These outputs are sent through the pipes 150 of the fire protection system 100, using the pipes as waveguides for the signals.

FIGS. 10, 11A, 11B, 12A, and 12B depict various types of sprinkler heads that may be controlled and/or monitored using communications sent through pipes of a sprinkler system (e.g., fire protection system 100). Each of the sprinklers 130, 310, 410 has an actuating mechanism that can be controlled and/or monitored by a control panel or LPU 235. Further information about how these sprinklers actuate is described in further detail in International Patent Publication Number WO 2015/191619 A1, which was previously incorporated by reference in its entirety. Each actuating mechanism can be coupled to an antenna 162 by a wire 164 that extends into the plug socket of the sprinkler. The antenna 162 may be a wire, wire loop, or other electronic component(s) designed to pick up a signal. Other components of an RFID tag can exist in the socket/plug with the antenna 162 or may be placed nearer to the actuating mechanism. By inserting the antenna 162 into the chamber of the socket/plug where firefighting liquid flows, the antenna can pick up RF signals that are inside the socket/plug portion. Any of the sprinklers depicted in FIGS. 10, 11A, 11B, 12A, and 12B can replace sprinklers to retrofit fire protection systems without having to make modifications to the pipe systems. Because plug socket of the sprinkler is connected with the inside of the pipe system once the sprinklers are installed, any signals transmitted into the pipe system can be read/picked up by the antennas 162. Likewise, the RFID tags/chips of the sprinklers or other devices can transmit signals through the antennas 162 into the pipe system via the plug sockets of the sprinkler systems. This configuration can also make replacement of malfunctioning sprinkler heads easy, as the sprinklers can be screwed in and out of the pipe system with ease.

Figure 13:
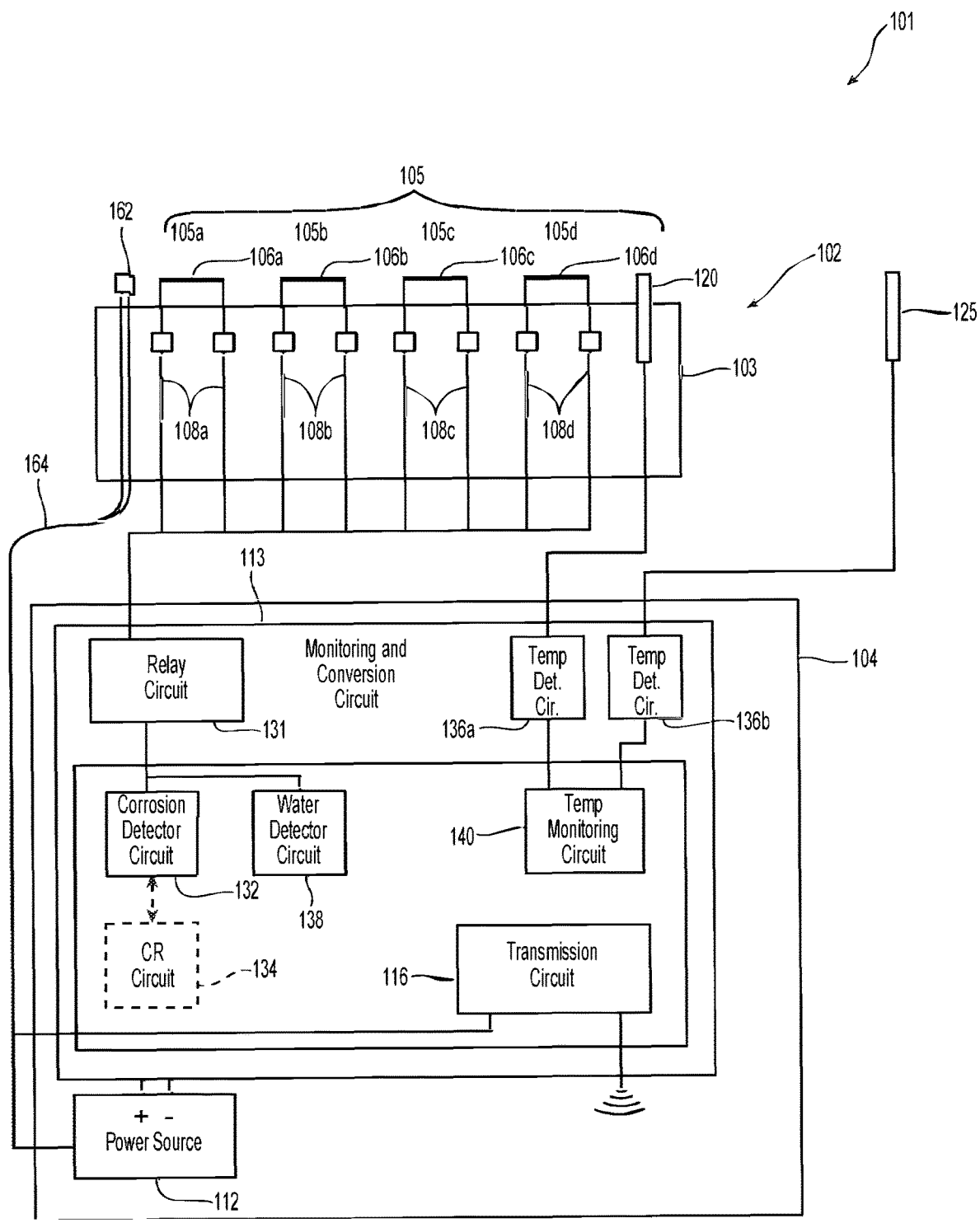
FIG. 13 is a schematic view of a corrosion monitoring device.

FIG. 13 depicts a corrosion monitoring device 101. The corrosion monitoring device 101 can perform one or two-way communication with LPUs (e.g., LPU 235) or other devices through the pipe system 100. The corrosion monitoring device 101 includes a sensor assembly 102 and control unit 104. The sensor assembly 102 includes one or more wire loops 105 and an antenna 162 that are disposed in a plug 103. Each of the wire loops 105A-105D respectively includes a coupon portion 106A-106D and a connection portion 108A-108D. The connection portions 108A-108D electrically connect coupon portions 106A-106D to control unit 104. At least one coupon portion 106A-106D has a different cross-sectional area than the other coupon portions 106A-106D. In some embodiments, each of the coupon portions 106A-106D has a different cross-sectional area than the other coupon portions 106. At least the coupon portion 106A-106D of each of the wire loops 105A-105D is exposed to the same corrosive environment that the equipment to monitor is exposed to. For example, in an exemplary application of a piping system where the interior of a pipe 150 is monitored for corrosion, the coupon portion 106 can be exposed to the interior of the pipe 150. Similarly, the antenna 162 is exposed to the interior of the pipe 150 to allow it to receive and transmit signals in the pipe, according to the various embodiments disclosed herein. The coupon portions 106A-106D can be made of material that is the same as the equipment being monitored, e.g. the same material as the interior wall material of pipe 150, so that a rate of corrosion of the coupon portion 106A-106D matches a rate of corrosion of the equipment being monitored. For example, for a carbon-steel pipe, the coupon portions 106A-106D can be made of the same carbon-steel material. In some embodiments, one or more of the coupon portions 106 is not made of the same material as the equipment being monitored but is made of a material where the level of corrosion of the coupon portion can still be correlated to the level of corrosion (e.g., weight loss per area, loss of thickness, or some other measure of corrosion) of the pipe wall and/or the rate of corrosion of the coupon portion can still be correlated to the rate of corrosion (e.g., mpy or mmy) of the pipe wall. In the case of coated equipment such as coated pipes, the coupon portion 106 may be made of the base metal and is not coated so as to provide an early indication of potential corrosion problems. In some embodiments, the coupon portion 106 can also be coated to match the equipment being monitored. For example, if the equipment being monitored is galvanized, the coupon portion 106 can also be galvanized. If a pipe is not metal but has a metal coating, the coupon portion may match the metal coating of the pipe.

The antenna 162 is connected to the transmission circuit 116 and a power source 112. In this way, as disclosed herein, signals can be sent to and from the corrosion monitoring device 101 through the antenna extending into the pipe 150. Additionally, the RFID tag can serve as the power source 112 or a power source for the other circuit components of the corrosion monitoring device 101. In an alternative embodiment, the power source 112 of the corrosion monitoring device 101 may include a battery (or super capacitor) and signals picked up by the antenna 162 may also be used to charge the battery (or super capacitor).

As depicted in FIG. 13, the control unit 104 can include a monitoring and conversion circuit 113, a power source 112, and a transmission circuit 116. The power source 112 provides power to the monitoring and conversion circuit 113. The monitoring and conversion circuit 113 provides currents that respectively flow through coupon portions 106A-106D of the respective wire loops 105A-105D. For example, the monitoring and conversion circuit 113 can include a corrosion detector circuit 132 that outputs a current through each of the wire loops 105A-105D. The corrosion detector circuit 132 can include a sensor to sense the current through at least one wire loop 105 (e.g., via a current sensor). The corrosion detector circuit 132 provides a constant or near constant voltage drop across the coupon portions 106A-106D such that the respective current through each of the loops 105A-105D varies in time based on the amount of corrosion the respective coupon portions 106A-106D have experienced. For example, the coupon portions 106 are configured to corrode such that, as the coupon portions 106A-106D corrode, the current through each loop 105A-105D changes due to a decrease in the cross-sectional area of each coupon portion 106A-106D, which increases the resistance in the respective wire loops 105A-105D. Based on the sensed value or values of each wire loop 105A-105D, the corrosion detector circuit 132 (or another device such as monitoring platform 230—see FIG. 16) can calculate respective resistance values of the coupon portions 106A-106D, which can include instantaneous resistance values and/or averaged resistance values. In some embodiments, the detector circuit 132 can be configured to keep the current through each wire loop 105A-105D constant while sensing the voltage drop across each wire loop 105A-105D. Regardless of the type of sensing method (sensed voltage or sensed current), the $i^2r$ (resistive) heating of the coupon portions 106A-106D does not adversely affect the calculations and/or is taken into account when calculating the resistance of the coupon portions 106A-106D. In an alternative embodiment, a coupon of a corrosion monitoring device may be used as an antenna and be coupled to the transmission circuit 116 and/or the power source 112. By monitoring the coupon portions 106A-106D, the system can determine if corrosion is happening in a pipe. In accordance with various embodiments, such tracking can be communicated to an LPU using the communications methods disclosed herein, so that the system can make users aware of corrosion levels, or warn that replacement pipes will be needed soon, for example.

As depicted in FIG. 13, the monitoring and conversion circuit 113 can include a corrosion rate circuit 134 that determines the change in the resistance values over time of the respective wire portions 106 and correlates the change in the resistance values to a level of the corrosion (e.g., weight loss per area, loss of thickness of the metal, or some other measure of corrosion) and/or a rate of corrosion (e.g., mpy or mmy) of the equipment being monitored (e.g., the wall of a pipe 150). The corrosion rate circuit 134 correlates the change in resistance values to a loss of weight (e.g., in grams) per area of the respective coupon portions 106. In some embodiments, when more than one wire loop 105 is used, the loss of weight can be averaged over the number of wire loops 105. For example, the calculated change in resistance readings of the wire loops 105 can be averaged. The conversion circuit 134 is configured to correlate the loss of weight per area of the coupon portion 106 to an estimated loss of weight per area of the equipment being monitored, e.g., the loss of weight per area of the wall of pipe 150. The correlations are determined empirically (e.g., the correlation between change in resistance values to the estimated loss of weight per area of the coupon and the correlation between the estimated loss of weight per area of the coupon and the estimated loss of weight per area of the equipment). In some embodiments, the corrosion rate circuit 134 calculates the corrosion rate (CR) of the coupon portion 106 and/or the equipment being monitored. In some embodiments, the monitoring and conversion circuit 110 does not include corrosion rate circuit 134 and the corrosion level and corrosion rate calculations are performed by another device such as, e.g., monitoring platform 230. In such cases, the resistance and/or change in resistance values (or information related to the resistance values) are transmitted by control unit 104 to the other device for processing. Whether performed by monitoring and conversion circuit 110 or an external device (e.g., monitoring platform 230), the information related to resistance values, changes in resistance values, corrosion level, and/or corrosion rate is transmitted to a user.

As depicted in FIG. 13, the corrosion monitoring device 101 can include a temperature sensor 120 in some embodiments. The temperature sensor 120 is disposed in plug 103 and senses the temperature of the corrosive environment. For example, in an exemplary embodiment temperature sensor 120 can sense the temperature of the inside of pipe 150. The monitoring and conversion circuit 113 includes temperature detector circuit 136 that receives the signal from temperature sensor 120 and converts the sensor signal to a temperature value. The temperature sensor 120 can be any appropriate sensor such as, e.g., a thermocouple, RTD, a thermistor (NTC or PTC), or some other type of temperature sensing device. In some embodiments, the temperature sensor 120 is a 10K NTC thermistor. The temperature value from sensor 120 is read by appropriate circuitry in monitoring and conversion circuit 110 or another device (e.g., monitoring platform 230) to predict potential problems due to the temperature, e.g., problems such as whether and when any water in the equipment (e.g., pipe 150) will freeze.

In some embodiments, a second temperature sensor 125 senses the ambient temperature outside the equipment being monitored for corrosion. For example, the temperature sensor 125 can sense the temperature of the ambient air surrounding the pipe 150. The temperature sensor 125 is disposed outside the corrosion monitoring device 101. The temperature detector circuit 136 receives the signal from temperature sensor 125 and converts the sensor signal to a temperature value. In some embodiments, similar to the temperature sensor 120, the second temperature sensor 125 is also disposed in the corrosion monitoring apparatus 101 but is arranged such that, while the temperature sensor 120 senses the temperature of the corrosive environment, e.g., inside the pipe 150, the second temperature sensor 125 senses the ambient temperature, e.g. outside the pipe 150. The temperature sensor 125 can be any appropriate known sensor such as, e.g., a thermocouple, RTD, a thermistor (NTC or PTC), or some other type of temperature sensing device. In some embodiments, the temperature sensor 125 is a 10K NTC thermistor. By sensing both the temperature of the environment of the equipment being monitored and the ambient temperature (e.g., the temperature inside and outside the pipe 150), the two temperatures can be read and compared by appropriate circuitry in monitoring and conversion circuit 110 or another device (e.g., monitoring platform 230) to predict potential problems in the equipment due to the temperature, e.g., whether and when any water will freeze. For example, in an exemplary embodiment, the monitoring and conversion circuit 113 or another device (e.g., monitoring platform 230) can predict whether there will be a failure of pipe 150 based on the temperature readings inside and/or outside the pipe 150. Information related to the temperatures, including temperature values and potential problems, can be transmitted to a user. In accordance with the embodiments disclosed herein, all of the information collected and determined by the temperature sensing and analysis components of the corrosion monitoring device 101 can be communicated through the pipes of a fire protection system as disclosed herein.

In some embodiments, the corrosion monitoring device 100 comprises a water detection circuit 138 to sense the presence or absence of water in the equipment being monitored (e.g., in pipe 150). All of the information collected and determined by the water detection circuit 138 and analysis components of the corrosion monitoring device 101 can be communicated through the pipes 150 of a fire protection system 100 as disclosed herein.

Figure 14:
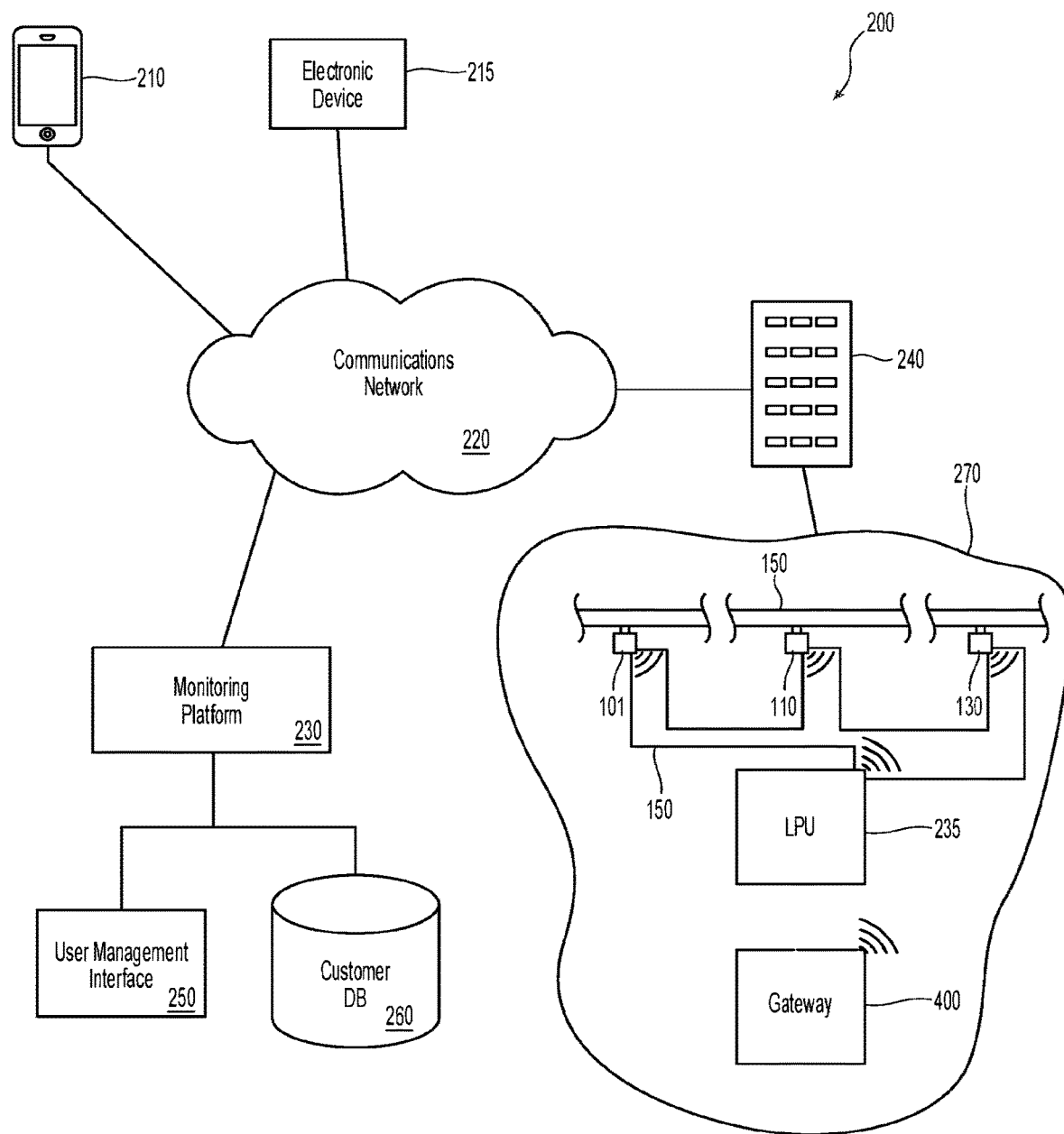
FIG. 14 depicts a schematic for an operating environment in which detector and distribution devices can be utilized.

As depicted in FIG. 13, the corrosion monitoring device 101 includes the transmission circuit 116 that includes a transmitter and/or transceiver that can be part of an RFID tag for transmitting sensor values and/or information derived from the sensor values such as, for example, temperature readings (ambient and/or equipment environment), water freeze indications, capacitance values, presence of water indication, resistance values, change in the resistance values, corrosion level values, corrosion rate values, and/or other sensor values and/or information to external devices (e.g., monitoring platform 230, depicted in FIG. 16) via the fire protection and corrosion monitoring system 270 and/or communications network 220 (see FIG. 14). In addition to the various values and information discussed above, the transmission circuit 116 can also transmit other information generated by the corrosion monitoring apparatus 100 such as the status of the corrosion monitoring apparatus 101 (e.g., on-line, off-line, working properly, not working, needs repair, and/or some other status value), status of the individual voltage, current, capacitance, and/or temperature sensors (e.g., working, not working, value out of range, and/or some other information concerning the sensors), status of the wire loops (e.g., closed, open or broken loop, expected life, or some other information concerning the wire loops), and/or some other information related to the readiness of corrosion monitoring apparatus 101. The transmission circuit 116 can use microwave RF signals and the pipe system as a waveguide as disclosed herein. The transmission circuit 116 may also receive signals from an LPU or other device through the antenna 162. Such signals may request some information from the corrosion monitoring device or may indicate that the corrosion monitoring device change a state (e.g., stop measuring something, turn off/on sensor, perform some local analysis based on information collected at the corrosion monitoring device, etc.).

Corrosion monitoring may occur based on signal processing and/or using corrosion monitoring devices as disclosed herein. Information collected by the systems and methods disclosed herein may be disseminated, processed, used, and/or otherwise sent/received. The methods and systems described below with respect to FIGS. 14-16 may be applied to all kinds of communications that are sent and received by the fire protection systems disclosed herein. For example, communications relating to detector measurements and states (e.g., on/off, malfunction, calibration needed), fluid distribution device instructions and state information, and any other device in the system may be sent/received. In addition, the systems and methods of FIGS. 14-16 below may be applied to corrosion information and/or communications, irrespective of whether the corrosion information and/or communications were derived from a corrosion monitoring device or were the product of signal processing to determine corrosion or corrosion related information.

FIG. 14 depicts an example of operating environment 200. As depicted in FIG. 14, operating environment 200 may include one or more mobile devices 210 (e.g., a mobile phone, tablet computer, mobile media device, mobile gaming device, vehicle-based computer, wearable computing device, portable computer, or other portable communication device), electronic device 215 (e.g., computers, servers, mainframes, or another non-portable type electronic device), communications network 220, monitoring platform 230 (e.g., running on one or more remote servers), fire protection and corrosion monitoring system 270 (including one or more corrosion monitoring devices 101, distribution devices 110, detectors 130, local processing unit 235, and/or gateway unit 400) located in a building 240, user management interface 250, fire protection system pipes 150, and a customer database 260. In some embodiments, the end user can monitor, e.g., via mobile device 210 and/or electronic device 215, the level of corrosion, fire conditions, states of devices in the system, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water by means of an app on the mobile device 210 and/or electronic device 215. In addition, other information such as sensor values, the status or state of the fire protection and corrosion monitoring system 270 (e.g., on-line, off-line, working properly, not working, needs repair, and/or some other status value), status of the individual voltage, current, capacitance, and/or temperature sensors (e.g., working, not working, value out of range, and/or some other information concerning the sensors), status of the wire loops (e.g., closed, open or broken loop, expected life, or some other information concerning the wire loops), and/or some other information related to the readiness of the fire protection and corrosion monitoring system 270 can be transmitted to the mobile device 210 and/or electronic device 215. The mobile device 210 and/or electronic device 215 can provide alerts, predicted maintenance times, predicted failures, or other information that shows the status of the equipment being monitored, e.g., a piping system, and/or the fire protection and corrosion monitoring system 270.

Mobile devices 210, electronic device 215 and the fire protection and corrosion monitoring system 270 can include network communication components that enable communication with remote hosting servers (e.g., monitoring platform 230), other computer and servers, or other portable electronic devices by transmitting and receiving wireless signals using licensed, semi-licensed or unlicensed spectrum over communications network 220. In some embodiments, communications network 220 may comprise multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 220 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Various components may be included in mobile devices 210 to enable network communication. For example, a mobile device 210 may be configured to communicate over a GSM mobile telecommunications network. As a result, the mobile device 210 or components of the fire protection and corrosion monitoring system 270 may include a Subscriber Identity Module (SIM) card that stores an International Mobile Subscriber Identity (IMSI) number that is used to identify the mobile device 210 on the GSM mobile communications network or other networks, for example, those employing 3G and/or 4G wireless protocols. If the mobile device 210, electronic device 215 or the fire protection and corrosion monitoring system 270 is configured to communicate over another communications network, the mobile device 210, electronic device 215 or components of the fire protection and corrosion monitoring system 270 may include other components that enable it to be identified on the other communications networks.

In some embodiments, mobile devices 210, electronic device 215 or components of the fire protection and corrosion monitoring system 270 in building 240 may include components that enable them to connect to a communications network using Generic Access Network (GAN) or Unlicensed Mobile Access (UMA) standards and protocols. For example, a mobile device 210 and/or electronic device 215 may include components that support Internet Protocol (IP)-based communication over a Wireless Local Area Network (WLAN) and components that enable communication with the telecommunications network over the IP-based WLAN. Mobile devices 210, electronic device 215 or components of the fire protection and corrosion monitoring system 270 may include one or more mobile applications that need to transfer data or check-in with monitoring platform 230.

In some embodiments, monitoring platform 230 can be configured to receive signals regarding the state of one or more fire protection and corrosion monitoring systems 270. The signals can indicate the current status of a variety of system components. For example, in accordance with some embodiments, the signals can include information related to the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water. In addition, monitoring platform 230 can be configured to receive signals related to other information such as sensor values, the status of the fire protection and corrosion monitoring system 270 (e.g., on-line, off-line, working properly, not working, needs repair, and/or some other status value), status of the individual voltage, current, capacitance, and/or temperature sensors (e.g., working, not working, value out of range, and/or some other information concerning the sensors), status of the wire loops (e.g., closed, open or broken loop, expected life, or some other information concerning the wire loops), and/or some other information related to the readiness of the fire protection and corrosion monitoring system 270. The monitoring platform 230 can also be configured to provide alerts, predicted maintenance times, predicted failures, or other information that shows the status of the equipment being monitored, e.g., a piping system, and/or the fire protection and corrosion monitoring system 270 in the building 240 to external devices such as, e.g., mobile device 210 and/or electronic device 215.

Monitoring platform 230 can provide a centralized reporting platform for companies having multiple properties with fire protection and corrosion monitoring systems 270. For example, a hotel chain or restaurant chain may desire to monitor piping systems in multiple properties via monitoring platform 230. This information can be stored in a database in one or more corrosion monitoring system profiles. Each of the corrosion monitoring system profiles can include a location of a fire protection and corrosion monitoring system 270, a corrosion monitoring system identifier, a list of components of the fire protection and corrosion monitoring system 270, a list of sensors available on the fire protection and corrosion monitoring system 270, current and historical state information (including information related to the sensors, the level/rate of corrosion, the temperature of the water, presence or absence of water, and/or status of the fire protection and corrosion monitoring system 270, etc.), contact information (e.g., phone numbers, mailing addresses, etc.), maintenance logs, and other information. By recording the maintenance logs, for example, monitoring platform 230 can create certifiable maintenance records to third parties (e.g., insurance companies, fire marshals, etc.) which can be stored in customer database 260.

The fire protection and corrosion monitoring system 270 in building 240 can include a local processing unit 235 that communicates with one or more of the corrosion monitoring devices 101, detectors 130, and distribution devices 110 using the pipe system 150 as a waveguide for the communication signals. Local processing unit 235 can be configured to receive the sensor values and/or other information, as discussed above, from one or more of the corrosion monitoring devices 101, detectors 130, and distribution devices 110 and transmit the sensor values and/or other information to monitoring platform 230 via, e.g., communications network 220. In some embodiments, local processing unit 235 can directly communicate the sensor values and/or other information from one or more corrosion monitoring devices 101, detectors 130, and distribution devices 110 to monitoring platform 230. In other embodiments, the fire protection and corrosion monitoring system 270 in building 240 includes a gateway 400 that can communicate with one or more local processing units 235 and the local processing unit 235 can transmit the sensor values and/or other information from the corrosion monitoring devices 101, detectors 130, and distribution devices 110 to the gateway unit 400 using standard transmission methods or through pipes as disclosed herein (or a combination of the two). The gateway unit 400, upon receiving the signal values, can then transmit (e.g., using a cellular or IP-based network) the sensor values and/or other information from the corrosion monitoring devices 101, detectors 130, and distribution devices 110 to the monitoring platform 230 (or other device) via communications network 220.

In some embodiments, the corrosion monitoring devices 101, detectors 130, and distribution devices 110 can include local memory to record information over a period of time. Then, local processing unit 235 can transmit retrieve the information from the corrosion monitoring devices 101, detectors 130, and distribution devices 110 and send the information in batches to the monitoring platform 230. These transmissions may be prescheduled (e.g., every ten minutes, every hour, once a day, etc.), event triggered, and/or coordinate with respective relay circuits 131 of corrosion monitoring devices 100. As one example, the system may send more frequent transmission based on the type of piping system (wet or dry), based on the temperature of the equipment environment, the environment outside the pipe, the presence or absence of water, the corrosion level value, the corrosion rate value, and/or some other criteria. The information recorded by the corrosion monitoring devices 101, detectors 130, and distribution devices 110, and LPUs 235 can be, e.g., information related to the sensor values (e.g., voltage, current, temperature, capacitance, or some other sensor value), information related to the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), and/or the presence or absence of water, and/or information related to the status of the corrosion monitoring devices 101, detectors 130, and distribution devices 110, including status of sensors, (e.g., on-line, off-line, working properly, not working, needs repair, and/or some other status value). Any of this data can be communicated from the corrosion monitoring devices 101, detectors 130, and distribution devices 110 to the LPU 235 using the pipes as a waveguide as disclosed herein.

Figure 15:
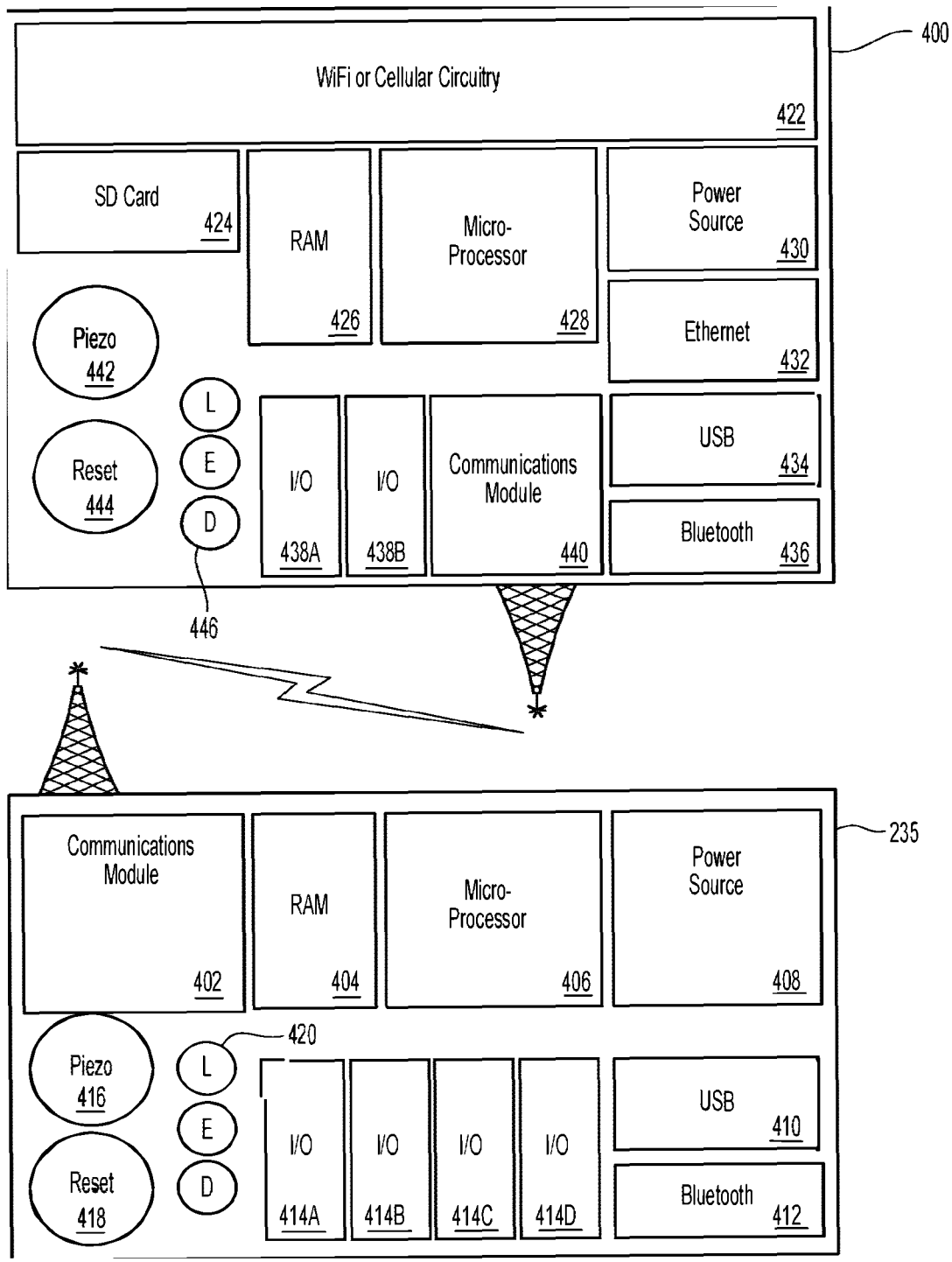
FIG. 15 is a schematic view of a set of components within an LPU associated with a gateway unit capable of receiving transmissions from one or more LPUs.

FIG. 15 illustrates a set of components within a local processing unit 235 associated with the corrosion monitoring devices 101, detectors 130, and distribution devices 110 and a gateway unit 400 capable of receiving transmissions from one or more local processing units 235 according to one or more embodiments of the present technology. In accordance with various embodiments, local processing unit 235 and gateway unit 400 can be low-power, microprocessor-based devices focused solely on a particular application. These units may include processing units, memories, I/O capabilities, audible and visual signaling devices, and external communications capabilities. For example, local processing unit 235 can include communications module 402, RAM 404, microprocessor 406, power source 408, USB 410, Bluetooth 412, I/O's 414A-414D, piezo 416 for providing a local audible alarm, reset 418 for resetting the alarm, and LEDs 420 and components for communicating with devices using RFID technology as disclosed herein. Local processing unit 235 can communicate (e.g., wirelessly) with the corrosion monitoring devices 101, detectors 130, and distribution devices 110 and other devices monitoring the piping system in building 240. Similarly, gateway unit 400 can include Wi-Fi or cellular circuitry 422, SD card 424, RAM 426, microprocessor 428, power source 430, Ethernet 432, USB 434, Bluetooth 436, I/O's 438A-438B, communications module 440, piezo 442 for providing a local audible alarm, reset 444 for resetting the alarm, and/or LEDs 446.

Microprocessors 406 and 428 can have unique identifiers (IDs) programmed or set at the manufacturing level. The unique IDs can be used to link or associate local processing unit 235 or gateway unit 400 with customers, particular fire protection and corrosion monitoring systems 270, physical sites, and/or other information. Owners and system service providers can be notified, e.g., via mobile device 210 and/or electronic device 215, of the level of corrosion, the rate of corrosion, the thickness of the equipment (e.g., thickness of the pipe walls), the temperature of the equipment environment (e.g., temperature inside the pipe), the ambient temperature (e.g., temperature outside the pipe), the presence or absence of water, as sensor values, the status of the fire protection and corrosion monitoring system 270, the corrosion monitoring device 101, (e.g., on-line, off-line, working properly, not working, needs repair, and/or some other status value), status of the individual voltage, current, capacitance, and/or temperature sensors (e.g., working, not working, value out of range, and/or some other information concerning the sensors), status of the wire loops (e.g., closed, open or broken loop, expected life, or some other information concerning the wire loops), and/or some other information related to the readiness of fire protection and corrosion monitoring system 270. Owners and system service providers can be notified, e.g., via mobile device 210 and/or electronic device 215, of alerts, predicted maintenance times, predicted failures, or other information that shows the status of the equipment being monitored, e.g., a piping system, and/or the fire protection and corrosion monitoring system 270. User profiles enable the end user to define his or her type or types of notification and when they occur (any time versus specific times). Accordingly, the notification capabilities are not solely limited to alarm notifications. Since the system is capable of identifying maintenance activity and/or normal states, the system can be configured to notify end users, technicians and customers of the states.

I/Os 414A-414D can be simple contact closure with a mechanical option to connect a switch to the normally open or normally closed terminals. This can help accommodate a variety of system configurations and may result in less field programming. Audible and visual warnings can be local (within the vicinity of the monitored system). For example, visual indicators may be board-based LED's 420, and audible would be a buzzer or piezo 416. Other embodiments may also include dry or wet contacts to provide binary alarm, warning, supervisory, trouble or other alerts to secondary fire, security, building automation or like systems on site.

Local processing unit 235 and gateway unit 400 can have a variety of external communications. In some embodiments, these components can support serial or USB communications so that the device can be programmed, configured or interrogated. A local Ethernet port 432 (supporting POE) may also be available in some embodiments. Additional communications options may include the ability to add a daughter board for Wi-Fi or Cellular connectivity. This component can allow all data and events local to the system to a centralized server (e.g., monitoring platform 230).

Figure 16:
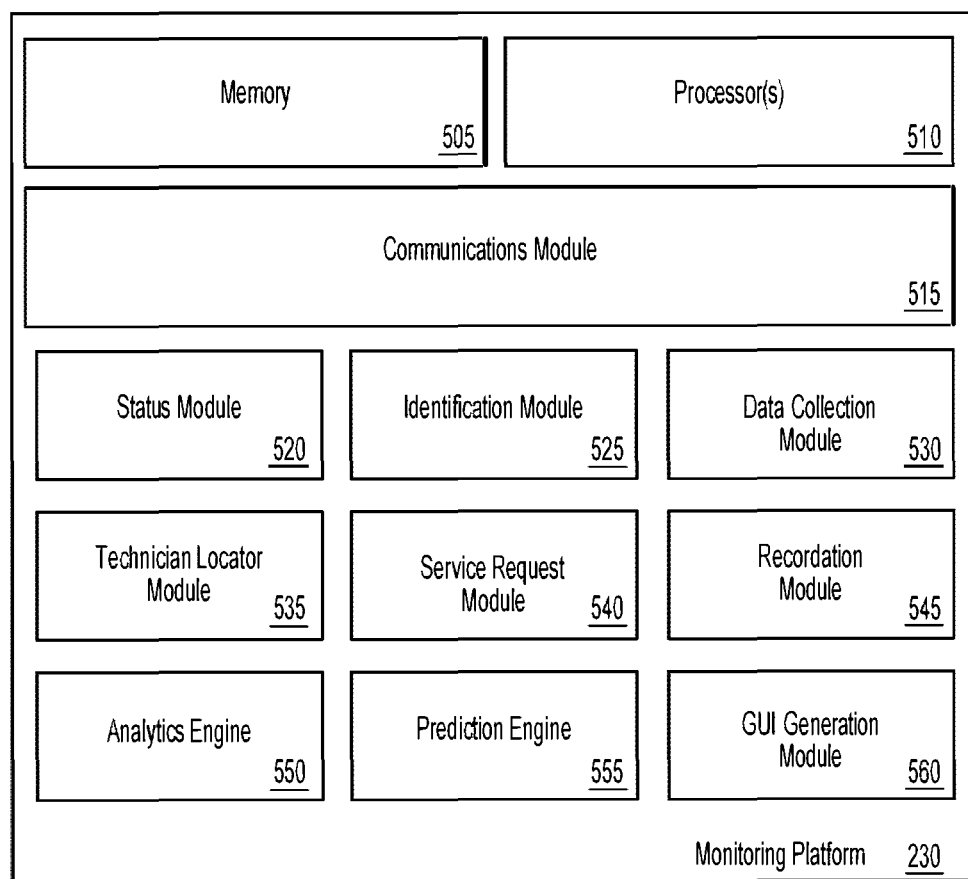
FIG. 16 depicts components within a monitoring platform.

FIG. 16 depicts a monitoring platform 230. Monitoring platform 230 can include memory 505, one or more processors 510, communications module 515, status module 520, identification module 525, data collection module 530, technician locator module 535, service request module 540, recordation module 545, analytics engine 550, prediction engine 555, and graphical user interface (GUI) generation module 560. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special-purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, status module 520 and identification module 525 can be combined into a single module for determining the status of the corrosion monitoring devices 101, detectors 130, and distribution devices 110.

Memory 505 can be any device, mechanism, or populated data structure used for storing information. In accordance with some embodiments of the present technology, memory 505 can encompass any type of, but is not limited to, volatile memory, nonvolatile memory and dynamic memory. For example, memory 505 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Memory 505 may be used to store instructions for running one or more applications or modules on processor(s) 510.

For example, memory 505 could be used in one or more embodiments to house all or some of the instructions needed to execute the functionality of communications module 515, status module 520, identification module 525, data collection module 530, technician locator module 535, service request module 540, recordation module 545, analytics engine 550, prediction engine 555 and/or GUI generation module 560. While not shown in FIG. 16, in some embodiments, an operating system can be used to provide a software package that is capable of managing the hardware resources of monitoring platform 230. The operating system can also provide common services for software applications running on processor(s) 510.

Communications module 515 can be configured to manage and translate any requests from external devices (e.g., mobile devices 210, electronic device 215, the corrosion monitoring devices 101, detectors 130, and distribution devices 110, etc.) or from graphical user interfaces into a format needed by the destination component and/or system. Similarly, communications module 515 may be used to communicate between the system, modules, databases, or other components of monitoring platform 230 that use different communication protocols, data formats, or messaging routines. For example, in some embodiments, communications module 515 can receive measurements of the current state of the corrosion monitoring devices 101, detectors 130, and distribution devices 110. Communications module 515 can be used to transmit status reports, alerts, logs, and other information to various devices.

Status module 520 can determine the status of the equipment being monitored, e.g., piping systems, corresponding to the corrosion monitoring devices 101, detectors 130, and distribution devices 110. For example, status module 520 may use communications module 515 to directly request a status of equipment such as the corrosion monitoring devices 101, detectors 130, and distribution devices 110 from one or more gateways 400 or local processing units 235. Identification module 525 can be configured to receive sensor data and/or other information, as discussed above, generated by the corrosion monitoring devices 101, detectors 130, and distribution devices 110, e.g., sensors in and information generated by corrosion monitoring devices 100. Using the received sensor data and/or other information, identification module 525 can then identify an operational status of the equipment such as the corrosion monitoring devices 101, detectors 130, and distribution devices 110, e.g., a piping system. The operational status and/or the sensor data itself can then be recorded within a corrosion monitoring profile in a database for the monitored equipment. As a result, the corrosion monitoring profile can provide a history of the operational status of the equipment such the corrosion monitoring devices 101, detectors 130, and distribution devices 110 over time. In accordance with some embodiments, the operational status can include a functional status indicating that the equipment such as the corrosion monitoring devices 101, detectors 130, and distribution devices 110 should operate as expected, a maintenance status indicating when the monitored equipment should undergo maintenance and/or inspection, and an inoperative status indicating that the monitored equipment may not operate as expected.

Data received via communications module 515 can be accessed by data collection module 530 for processing, formatting, and storage. Data collection module 530 can keep track of the last communication from each of the corrosion monitoring devices 101, detectors 130, and distribution devices 110 and generate an alert if any corrosion monitoring device 100 fails to report on schedule (e.g., every minute, every five minutes, or other preset schedule) and/or when a request is made. Data collection module 530 can also review the quality of the data received and identify any potential issues. For example, if a data set from the corrosion monitoring devices 101, detectors 130, and distribution devices 110 includes various sensor data, data collection module 530 can analyze the data to determine any erratic behavior or outliers that may indicate that a sensor is beginning to fail.

Technician locator module 535 can be configured to receive location and schedule updates from mobile devices 210 associated with technicians. Service request module 540 can be configured to identify when the operational status of the equipment such as the corrosion monitoring devices 101, detectors 130, and distribution devices 110, e.g., a piping system, is inoperative and identify an available technician using the technician locator. As a technician is servicing the monitored equipment, he or she may use a computer application or a mobile application to report various findings, observations, parts replaced, and the like. As this information is transmitted to monitoring platform 230, recordation module 545 can record the information from the technician in the appropriate corrosion monitoring profile.

Analytics engine 550 can analyze the sensor data from the corrosion monitoring devices 101, detectors 130, and distribution devices 110 and perform the functions discussed above with respect to corrosion rate circuit 134. Because these function are discussed above, for brevity, they will not be further discussed. The analytics engine can also generate a correlation model that is predictive of when a failure of the monitored equipment is likely, e.g., due to thinning pipe walls, predictive of when freezing of the equipment, e.g., pipes, is likely to occur, predictive of some other type of abnormal operating state of the equipment being monitored, predictive of when certain maintenance and/or inspection activities should occur, and/or predicts some other type of abnormal operating condition and/or inspection activity. The correlation model (or models) can be generated based on one or more of the following: sensor data relating to the resistance of each the coupon portions 106A-106D, the level of corrosion, and/or the rate of corrosion; other sensor data such as the temperature of the equipment environment (e.g., inside the pipe) and/or ambient temperature (e.g., outside the pipe), and/or the presence or absence of water; and other types of information such as the thickness of the equipment (e.g., the thickness of the piping wall), the equipment material, and/or observations from the technicians during inspections. Prediction engine 555 can be configured to process the sensor data in real-time against the correlation model or models generated by the analytics engine 550 and generate an alarm condition, an inspection request based on the information gathered from the sensors in the fire protection and corrosion monitoring system 270, and/or determine the respective power up intervals for the relay circuit 130 in the corrosion monitoring devices 101, detectors 130, and distribution devices 110. For example, if the level and/or rate of corrosion is low, the time between maintenance inspections and/or power up interval of relay circuit 130 can be extended. However, if the level and/or rate of corrosion starts to increase, the time between inspections and/or the power up interval of relay circuit 130 can be decreased. In another example, the inspection of the piping system can be based on the number of freezing and thawing cycles the piping system experienced in a given time period. Many additional examples of how analytics engine 550 may be utilized exist. Analytics engine 550 can also monitor the sensor data and generate other types of analytics. In some embodiments, part or all of the functions of analytics engine 550 and/or prediction engine 555 can be incorporated into local processing unit 235 and/or corrosion monitoring device 100.

GUI generation module 560 can generate one or more GUI screens that allow for interaction with a user. In at least one embodiment, GUI generation module 560 can generate a graphical user interface allowing a user to set preferences, review reports, create profiles, set device constraints, and/or otherwise receive or convey information about device customization to the user. For example, in some embodiments, GUI generation module 560 can be configured to retrieve, from the database, the information from the multiple corrosion monitoring profiles. Once the information has been retrieved, GUI generation module 560 can generate a graphical user interface allowing a user to see the operational status of any of the profiles of the equipment being monitored, e.g., via mobile device 210 and/or electronic device 215. Preferably, the information generated by the analytics engine 550 and/or the prediction engine 555 as discussed above are sent to the user and/or are available to the user via the GUI screens.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A fire protection system, comprising:
a pipe system in fluid communication with a water source;
a local processing unit coupled with a radio frequency identification (RFID) reader antenna;
a plurality of sensors each monitoring a sensor area for the presence of a fire and in electrical communication with the local processing unit;
a plurality of fluid distribution devices in fluid communication with the pipe system and configured to deliver water from the water source to the sensor area, each of the plurality of fluid distribution devices comprising:
a frame body having an inlet, an outlet in fluid communication with the inlet, and an actuator movable between a first position restricting fluid flow from the inlet through the outlet and a second position allowing fluid flow from the inlet through the outlet; and
an RFID tag apparatus coupled with the frame body and configured to controllably move the actuator between the first position and the second position, the RFID tag apparatus comprising:
an RFID tag antenna positioned within the pipe system and configured to transmit and receive radio frequency (RF) signals to and from the RFID reader antenna and local processing unit, the RFID tag antenna and the RFID reader antenna are each positioned within a fluid flow path through the pipe system between the inlet and the pipe system;
a processing circuit operatively coupled to the RFID tag antenna and configured to modulate and transmit RF signals through the RFID tag antenna, and further configured to receive and demodulate RF signals received by the RFID tag antenna, the processing circuit in electrical communication with the actuator and configured to move the actuator between the first position and the second position in response to an RF signal received by the RFID tag antenna; and
a power circuit operatively coupled to and supplying power to the processing circuit and the RFID tag antenna.

2. The fire protection system of claim 1, comprising:
the local processing unit transmits at least one RF signal through the pipe system to communicate with the RFID tag apparatus and the plurality of sensors at a frequency greater than or equal to 1 GHz and less than or equal to 3.5 GHz.

3. The fire protection system of claim 1, comprising:
fluid distribution systems and sensors are axially aligned with one another throughout the pipe system.

4. The fire protection system of claim 1, comprising:
the local processing unit includes an RFID reader in wireless electrical communication with each of the RFID tag apparatuses.

5. The fire protection system of claim 1, comprising:
the RFID reader antenna is positioned within the pipe system and configured to transmit RF signals into the pipe system.

6. The fire protection system of claim 1, comprising:
an interior of the pipe system is defined by a metallic material.

7. The fire protection system of claim 1, comprising:
each of the RFID tag antenna and the RFID reader antennas are configured to both transmit and receive microwave signals.

8. A fluid distribution device, comprising:
a frame body having an inlet, an outlet in fluid communication with the inlet, and an actuator movable between a first position restricting fluid flow from the inlet through the outlet and a second position allowing fluid flow from the inlet through the outlet; and
a radio frequency identification (RFID) tag apparatus coupled to the frame body and configured to controllably move the actuator between the first position and the second position, the RFID tag apparatus comprising:
an antenna configured to transmit and receive radio frequency (RF) signals;
a processing circuit operatively coupled to the antenna and configured to modulate and transmit RF signals through the antenna, and further configured to receive and demodulate RF signals received by the antenna, the processing circuit in electrical communication with the actuator and configured to move the actuator between the first position and the second position in response to an RF signal received by the antenna, the processing circuit to output a unique identifier of the RFID tag apparatus to indicate at least one of a temperature reading and a state of the actuator; and
a power circuit operatively coupled to and supplying power to the processing circuit and the antenna using power from the RF signals received by the antenna.

9. The fluid distribution device of claim 8, comprising:
the antenna sends and receives RF signals having a frequency between about 1 GHz and about 3.5 GHz.

10. The fluid distribution device of claim 8, comprising:
a fluid deflecting member coupled to the actuator, the fluid deflecting member axially spaced apart from the outlet and having a shape larger in circumference than the outlet.

11. The fluid distribution device of claim 8, comprising:
the antenna is located within the frame body, between the inlet and the outlet.

12. The fluid distribution device of claim 8, comprising:
the antenna is in wireless electrical communication with a local processing unit positioned away from the frame body.

13. The fluid distribution device of claim 8, comprising:
the antenna is a wire or a wire loop.

14. The fluid distribution device of claim 8, comprising:
the antenna is in wireless communication with an RFID reader coupled to a local processing unit.

15. The fluid distribution device of claim 8, comprising:
the processing circuit determines, based on the location of the actuator between the first position and the second position, a state of the fluid distribution device.

16. A detector device, comprising:
a sensor monitoring a sensor area for the presence of a fire; and
a radio frequency identification (RFID) tag apparatus coupled to the sensor and configured to transmit information received from the sensor, the RFID tag apparatus comprising:
an antenna configured to transmit and receive radio frequency (RF) signals;

a processing circuit operatively coupled to the antenna and configured to modulate and transmit RF signals through the antenna, and further configured to receive and demodulate RF signals received by the antenna, the processing circuit in electrical communication with the sensor and configured to prompt the sensor for a measurement in response to an RF signal received by the antenna, the processing circuit outputs a unique identifier of the RFID tag apparatus associated with a location of the sensor; and a power circuit operatively coupled to and supplying power to the processing circuit and the antenna.

17. The detector device of claim 16, comprising:

the sensor includes at least one of a temperature sensor, pressure sensor, flow rate sensor, smoke detector, thermal energy sensor, spectral energy sensor, thermocouple, thermistor, infrared detector, gas detector, combustible gas sensor, photoionization detector, infrared point sensor, ultrasonic sensor, electrochemical gas sensor, semiconductor sensor, corrosion monitoring sensor, and a sprinkler activation sensor.

18. The detector device of claim 16, comprising:

the processing circuit determines, based on the measurement signal from the sensor taken in response to the RF signal received by the antenna, a state of the detector device.

19. The detector device of claim 16, comprising:

the antenna is a wire or a wire loop positioned within a pipe in a fire protection system.

20. The detector device of claim 16, comprising:

the antenna is in wireless communication with an RFID reader coupled to a local processing unit and further in wireless electrical communication with a fluid distribution device coupled to a water source and configured to dispense water from the water source to the sensor area in response to the sensor detecting the presence of a fire in the sensor area.

* * * * *